US009133062B2

(12) United States Patent
Castilone et al.

(10) Patent No.: US 9,133,062 B2
(45) Date of Patent: Sep. 15, 2015

(54) METHOD OF FIRING CORDIERITE BODIES

(71) Applicant: CORNING INCORPORATED, Corning, NY (US)

(72) Inventors: Robert Joseph Castilone, Painted Post, NY (US); Sriram Rangarajan Iyer, Painted Post, NY (US); Mark Allen Spetseris, Pine City, NY (US); Jonathan Mark Stalker, Corning, NY (US)

(73) Assignee: Corning Incorporated, Corning, NY (US)

( * ) Notice: Subject to any disclaimer, the term of this patent is extended or adjusted under 35 U.S.C. 154(b) by 325 days.

(21) Appl. No.: 13/682,901

(22) Filed: Nov. 21, 2012

(65) Prior Publication Data

US 2014/0138882 A1    May 22, 2014

(51) Int. Cl.
*C04B 35/64* (2006.01)
*C04B 35/195* (2006.01)
(Continued)

(52) U.S. Cl.
CPC ............... *C04B 35/64* (2013.01); *C04B 35/195* (2013.01); *C04B 38/0006* (2013.01); *C04B 2111/0081* (2013.01); *C04B 2111/00793* (2013.01); *C04B 2235/6562* (2013.01); *C04B 2235/6567* (2013.01); *C04B 2235/6583* (2013.01); *C04B 2235/6584* (2013.01); *C04B 2235/661* (2013.01)

(58) Field of Classification Search
CPC .. C04B 38/0006; C04B 35/195; C04B 35/64; C04B 2235/6562; C04B 2235/6567; C04B 2235/6584; C04B 2235/661

USPC .......................................................... 264/631
See application file for complete search history.

(56) References Cited

U.S. PATENT DOCUMENTS

| 5,621,102 A | 4/1997 | Bianco et al. ................. 544/267 |
| 6,004,501 A | 12/1999 | Cornelius et al. ............. 264/631 |

(Continued)

FOREIGN PATENT DOCUMENTS

| DE | 10 2007 000 897 | 6/2012 |
| WO | 2012/074504 | 6/2012 |

OTHER PUBLICATIONS

Patent Cooperation Treaty International Notification of Transmittal of the International Search Report and the Written Opinion of the International Searching Authority, international application No. PCT/US2013/070862; mailing date Jan. 27, 2014, 9 pages.

*Primary Examiner* — Erin Snelting
(74) *Attorney, Agent, or Firm* — Joseph M. Homa; Matthew B. McNutt

(57) ABSTRACT

Methods of firing a cordierite green body to form a fired cordierite body. The green body comprises cordierite-forming raw materials and organic material, the body having a core portion and a skin portion. The green body is pre-heated to a pre-heat temperature that is less than a thermal decomposition temperature of the organic material. The green body is maintained at the pre-heat temperature for a period of time sufficient to minimize a temperature differential between the core portion and the skin portion. The green body is heated to a low firing temperature in a firing atmosphere sufficient to reduce a content of the organic material and to substantially remove chemically bound water from hydrous alumina. The green body is heated to a high firing temperature in a firing atmosphere sufficient to reduce the content of the organic material prior to a substantial removal of chemically bound water from clay.

35 Claims, 24 Drawing Sheets

(51) Int. Cl.
*C04B 38/00* (2006.01)
*C04B 111/00* (2006.01)

(56) References Cited

U.S. PATENT DOCUMENTS

| | | | |
|---|---|---|---|
| 6,004,502 A * | 12/1999 | Ito et al. | 264/631 |
| 6,048,490 A | 4/2000 | Cornelius et al. | 264/631 |
| 6,099,793 A * | 8/2000 | Dull et al. | 264/631 |
| 6,210,626 B1 | 4/2001 | Cornelius et al. | 264/631 |
| 7,887,897 B2 | 2/2011 | Lu et al. | 428/116 |
| 2002/0003322 A1* | 1/2002 | Dull et al. | 264/630 |
| 2002/0008334 A1* | 1/2002 | Gheorghiu et al. | 264/432 |
| 2003/0143370 A1 | 7/2003 | Noguchi et al. | 428/116 |
| 2003/0151155 A1* | 8/2003 | Muroi et al. | 264/44 |
| 2005/0242455 A1* | 11/2005 | Toda et al. | 264/44 |
| 2009/0298670 A1 | 12/2009 | Murtagh et al. | 501/80 |
| 2010/0218472 A1* | 9/2010 | Iyer | 55/523 |
| 2011/0121478 A1 | 5/2011 | Beall et al. | 264/44 |

* cited by examiner

METHOD OF FIRING CORDIERITE BODIES

BACKGROUND

1. Field

The present application relates to methods for firing cordierite bodies and, more particularly, to methods of firing cordierite bodies using reduced firing times.

2. Technical Background

Emission control devices, such as diesel particulate filters (DPF) or honeycomb catalyst carriers, are used to reduce the amount of particulate matter emissions (such as soot for DPFs and NOx and CO for honeycomb catalyst carriers) from diesel engines. DPFs, for example, may capture the particulate matter from the exhaust in the body of the filter. The soot collects in the filter up to a predetermined amount, at which point the filter is regenerated. Such devices may be regenerated (for example by burning) during engine operation to decrease the amount of trapped particulate matter and maintain the collection capacity of the device. Honeycomb catalyst carriers, for example, may support catalytically active components for catalytic converters on automobiles.

Cordierite is commonly used for DPFs and catalysts carriers due to its combination of excellent thermal shock resistance, filtration efficiency, and durability under most operating conditions. The cordierite bodies may be formed from a combination of cordierite precursors and organic constituents in the form of plasticizers, lubricants, binders, pore formers, and solvents.

To form the cordierite bodies, the cordierite precursors and organic constituents are first mixed into a plasticized batch and extruded to form a green ceramic body. Thereafter, the green ceramic body is fired to remove the organic constituents and sinter the cordierite precursors. The firing cycle can be quite long, sometimes greater than about 185 hours in duration, and in some instances, greater than about 200 hours. This is particularly true for larger filters having a diameter of at least about 12 in (about 305 mm).

In addition, during firing, the organic constituents combust, which in the presence of oxygen is a highly exothermic reaction that produces temperature spikes. These temperature spikes can thermally shock and/or crack the cordierite body.

Accordingly, the methods disclosed have been developed in view of these issues, and therefore, an object is to provide alternative firing cycles for producing crack-free cordierite bodies.

SUMMARY

According to one embodiment, methods of firing a cordierite body may include providing a green body comprising cordierite-forming raw materials and organic material, the body having a core portion and a skin portion, pre-heating the green body to a pre-heat temperature that is less than a thermal decomposition temperature of the organic material, maintaining the green body at the pre-heat temperature for a period of time sufficient to obtain a temperature differential between the core portion and the skin portion of less than about 50° C., heating the green body at a first temperature average ramp rate from the pre-heat temperature to a low firing temperature in a firing atmosphere comprising a first oxygen concentration for a period of time sufficient to reduce a content of the organic material and to substantially remove chemically bound water from hydrous alumina, and heating the green body at a second temperature average ramp rate from the low firing temperature to a high firing temperature in a firing atmosphere comprising a second oxygen concentration that is greater than the first oxygen concentration for a period of time sufficient to reduce the content of the organic material, wherein the content of the organic material is substantially removed prior to a removal of chemically bound water from clay.

In another embodiment, methods of firing a cordierite-forming body may include providing a green body comprising cordierite-forming raw materials and greater than or equal to about 10 wt % organic material, the green body having a core portion surrounded by a skin portion, pre-heating the green body to a pre-heat temperature at an pre-heat average ramp rate from about 6° C./hr to about 50° C./hr, wherein the pre-heat temperature is no more than 70° C. below a thermal decomposition temperature of the organic material, maintaining the green body at the pre-heat temperature for a time period from about 2 hours to about 8 hours such that a temperature differential between the core portion and the skin portion is minimized, heating the green body at a first temperature average ramp rate from the pre-heat temperature to a low firing temperature in a firing atmosphere comprising from about 9 wt % to about 15 wt % oxygen, wherein the low firing temperature is from about 270° C. to about 320° C., and the first temperature average ramp rate is equal to or less than about 7° C./hr, and heating the green body at a second temperature average ramp rate from the low firing temperature to a high firing temperature in a firing atmosphere comprising from about 12 wt % to about 18 wt % oxygen, wherein the high firing temperature is from about 500° C. to about 700° C., and the second temperature average ramp rate is from about 7° C./hr to about 40° C./hr to reduce a content of the organic material, wherein the content of the organic material is substantially removed prior to a removal of chemically bound water from clay.

In a further embodiment, methods of firing a cordierite body may include providing a green body comprising cordierite-forming raw materials and greater than or equal to about 10 wt % organic material, the green body having a core portion surrounded by a skin portion, pre-heating the green body to a pre-heat temperature for a time period of less than about 7 hours, wherein the pre-heat temperature is no more than 70° C. below a thermal decomposition temperature of the organic material, maintaining the green body at the pre-heat temperature for a time period from about 2 hours to about 8 hours such that a temperature differential between the core portion and the skin portion is minimized, heating the green body for a time period from the pre-heat temperature to a low firing temperature in a firing atmosphere comprising from about 9% to about 15% oxygen, wherein the low firing temperature is from about 270° C. to about 320° C., and the time period is less than about 40 hours, and heating the green body for a time period from the low firing temperature to a high firing temperature in a firing atmosphere comprising from about 12% to about 18% oxygen, the firing atmosphere sufficient to substantially reduce a content of the organic material prior to removal of chemically bound water from clay, wherein the high firing temperature is from about 500° C. to about 700° C. and the time period is less than about 15 hours.

Additional features and advantages of the methods described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
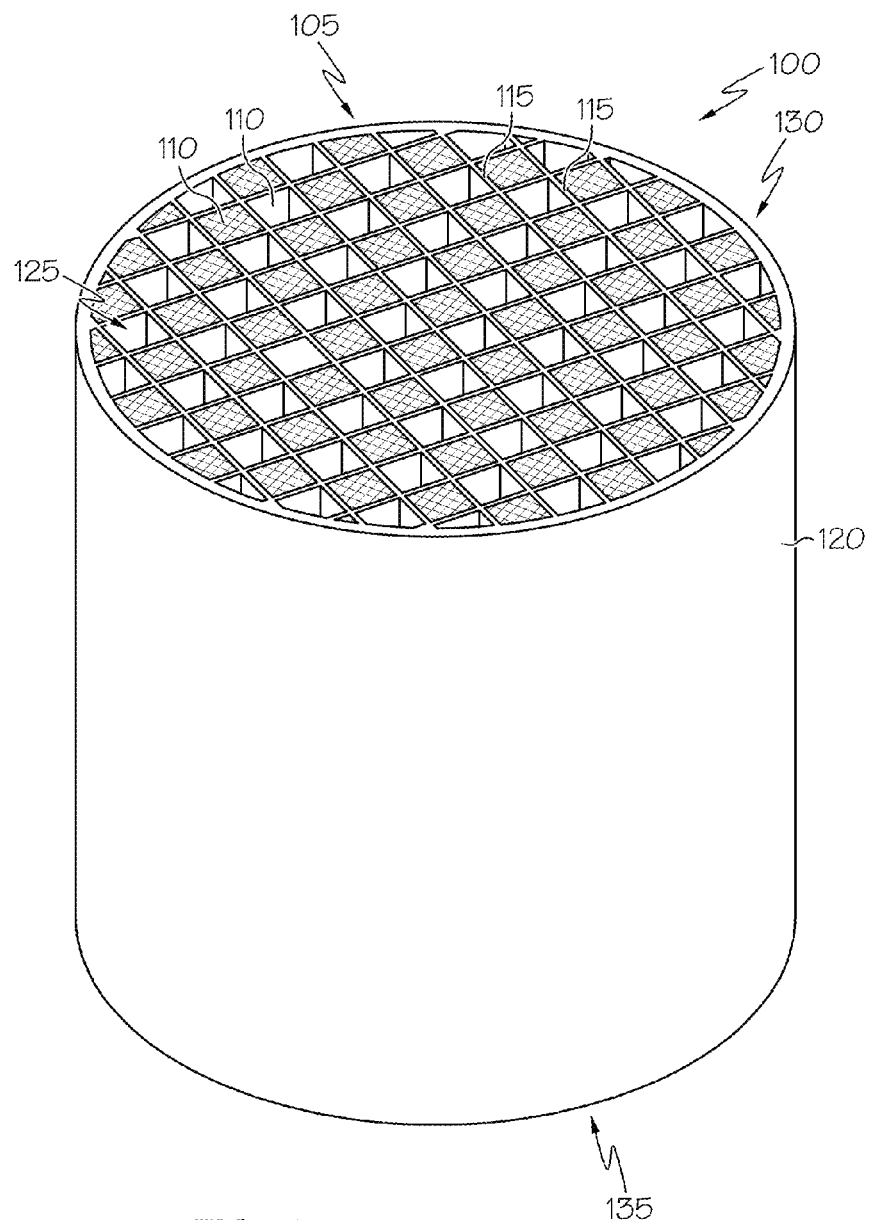
FIG. 1 schematically depicts a cordierite body according to one or more embodiments shown and described herein.

Reference will now be made in detail to embodiments of methods for firing cordierite bodies, embodiments of which are illustrated in the accompanying drawings. Whenever possible, the same reference numerals will be used throughout the drawings to refer to the same or like parts. In one embodiment, a method of firing a cordierite body includes providing a green body comprising cordierite-forming raw materials and organic material, the body having a core portion and a skin portion; pre-heating the green body to a pre-heat temperature; maintaining the green body at the pre-heat temperature for a period of time to minimize a temperature differential between the core portion and the skin portion; heating the green body at a first temperature average ramp rate from the pre-heat temperature to a low firing temperature for a period of time; and heating the green body at a second temperature average ramp rate from the low firing temperature to a high firing temperature for a period of time. Various methods of firing cordierite bodies will be described herein with specific reference to the appended drawings.

As used herein, "green body," "cordierite body," "cordierite material," and "cordierite-forming body" are used interchangeably an refer to an unsintered body or material, unless otherwise specified.

In the following description, it should be understood that when the core portion of a body is described as being heated to a given temperature, the entire body is heated to achieve the referenced temperature in the core portion. For example, where a green body is placed in a heating or firing chamber, such as a kiln, and heated, the temperature inside of the chamber is sufficient to heat the core portion to the specified temperature.

As used herein, a "wt %," "weight percent," or "percent by weight" of an inorganic or organic component, unless specifically stated to the contrary, is based on the total weight of the total inorganics in which the component is included. Organic components are specified herein as superadditions based upon 100% of the inorganic components used.

Embodiments of the present disclosure provide improved methods for firing cordierite-forming bodies. The cordierite-forming bodies or green bodies may comprise cordierite-forming raw materials and organic materials having an overall composition effective to yield cordierite ceramic upon firing, wherein the cordierite phase of the ceramic comprises at least 90% by weight of the ceramic. The cordierite ceramic body may be used as a diesel particulate filter and/or as a substrate support for catalytic materials.

Depicted in FIG. 1 is a cordierite ceramic body (100) according to one or more embodiments shown and described herein. The cordierite ceramic body (100) may generally have a honeycomb structure (105) comprising a plurality of parallel channels (110) defined by intersecting channel walls (115). A skin portion (120) is depicted and is the outer surface portion of the cordierite ceramic body (100). The core portion (125) is the inner portion of the cordierite ceramic body (100), and includes the plurality of parallel channels (110) defined by intersecting channel walls (115). The plurality of parallel channels (110) and intersecting channel walls (115) extend between an inlet end (130) and an outlet end (135).

In the embodiments described herein, the cordierite ceramic body (100) is formed from cordierite-forming raw materials. The cordierite-forming raw materials may include at least one magnesium source, at least one alumina source, at least one silica source, and at least one kaolin clay. In some embodiments, the cordierite-forming raw materials have an overall composition comprising, in weight percent on an oxide basis, 5-25 wt % MgO, 40-60 wt % $SiO_2$, and 25-45 wt % $Al_2O_3$. In other embodiments, the cordierite-forming raw materials has an overall composition comprising, in weight percent on an oxide basis, 11-17 wt % MgO, 48-54 wt % $SiO_2$, and 32-38 wt % $Al_2O_3$. In some embodiments, the at least one alumina source and at least one silica source are not kaolin clays. In other embodiments, kaolin clays, raw and calcined, may comprise less than 30 wt % or less than 20 wt %, of the cordierite-forming raw materials. The green body may also include impurities, such as, for example, CaO, $K_2O$, $Na_2O$, and $Fe_2O_3$.

In the embodiments described herein, sources of magnesium include, but are not limited to, magnesium oxide or other materials having low water solubility that, when fired, convert to MgO, such as $Mg(OH)_2$, $MgCO_3$, and combinations thereof. For example, the source of magnesium may be talc ($Mg_3Si_4O_{10}(OH)_2$), including calcined and/or uncalcined talc, and coarse and/or fine talc.

In various embodiments, the at least one magnesium source may be present in an amount from about 5 wt % to about 25 wt % of the overall cordierite-forming raw materials on an oxide basis. In other embodiments, the at least one magnesium source may be present in an amount from about 10 wt % to about 20 wt % of the cordierite-forming raw materials on an oxide basis. In further embodiments, the at least one magnesium source may be present in an amount from about 11 wt % to about 17 wt %.

In some embodiments, a median particle diameter of the at least one magnesium source may be greater than about 5 μm, greater than about 10 μm, or even greater than about 20 μm. In other embodiments, the at least one magnesium source may have a median particle diameter ranging from about 1 μm to about 40 μm or even from about 10 μm to about 40 μm. In other embodiments, the median particle diameter of the talc may be from about 15 μm to about 30 μm.

Sources of alumina include, but are not limited to, powders that, when heated to a sufficiently high temperature in the absence of other raw materials, will yield substantially pure aluminum oxide. Examples of suitable alumina sources may include alpha-alumina, a transition alumina such as gamma-alumina or rho-alumina, hydrated alumina or aluminum tri-hydrate, gibbsite, corundum ($Al_2O_3$), boehmite (AlO(OH)), pseudoboehmite, aluminum hydroxide ($Al(OH)_3$), aluminum oxyhydroxide, and mixtures thereof. In one embodiment, the at least one alumina source is a kaolin clay, and in another embodiment, the at least one alumina source is not a kaolin clay.

The at least one alumina source may be present in an amount from about 25 wt % to about 45 wt % of the overall cordierite-forming raw materials on an oxide basis, for example. In another embodiment, the at least one alumina source may be present in an amount from about 30 wt % to about 40 wt % of the cordierite-forming raw materials on an oxide basis. In a further embodiment, the at least one alumina source may be present in an amount from about 32 wt % to about 38 wt % of the cordierite-forming raw materials on an oxide basis. The at least one alumina source may have a median particle diameter of greater than about 1 μm. In some embodiments, the at least one alumina source has a median particle diameter ranging from about 1 μm to about 20 μm.

Sources of silica may include, but are not limited to, non-crystalline silica, such as fused silica or sol-gel silica, silicone resin, low-alumina substantially alkali-free zeolite, diatomaceous silica, kaolin, and crystalline silica, such as quartz or cristobalite. Additionally, the sources of silica may further include, but are not limited to, silica-forming sources that comprise a compound that forms free silica when heated. For example, silicic acid or a silicon organometallic compound may form free silica when heated. In one embodiment, the at least one silica source is not a kaolin clay.

The at least one silica source may be present in an amount from about 40 wt % to about 60 wt % of the overall cordierite-forming raw materials on an oxide basis. In some embodiments, the at least one silica source may be present in an amount from about 45 wt % to about 55 wt % of the cordierite-forming raw materials on an oxide basis. In a further embodiment, the at least one silica source may be present in an amount from about 48 wt % to about 54 wt %. The at least one silica source has a median particle diameter greater than about 3 μm. In some embodiments, the at least one silica source has a median particle diameter greater than about 5 μm. In further embodiments, the at least one silica source has a median particle diameter greater than about 10 μm. In even further embodiments, at least one silica source has a median particle diameter greater than about 20 μm. In some embodiments, the at least one silica source has a median particle diameter ranging from about 5 μm to about 40 μm. In other embodiments, the at least one silica source has a median particle diameter ranging from about 10 μm to about 30 μm. In further embodiments, the at least one silica source has a median particle diameter ranging from about 15 μm to about 25 μm.

Sources of kaolin clays may include, but are not limited to, laminated and delaminated kaolins. In some embodiments, the cordierite-forming raw materials may further comprise calcined kaolin clay, laminated or delaminated. For example, the cordierite-forming raw materials may comprise a blend of at least one raw kaolin clay and at least one calcined kaolin clay. In some embodiments, the at least one kaolin clay comprises a blended hydrous kaolin clay product comprising a coarse kaolin clay component and a fine kaolin clay component. In some embodiments, the coarse kaolin clay component has a mean particle size of less than 2 μm in diameter and is a cretaceous clay, and the fine kaolin clay component has a mean particle size less than 1 μm in diameter and is a tertiary clay. In some embodiments, the clay product comprises from about 35 wt % to about 100 wt % of the fine kaolin clay component and from about 65 wt % to about 0 wt % of the coarse kaolin clay component.

The total amount of kaolin clay, including raw and calcined kaolin clays, when present, may comprise less than about 30 wt % of the cordierite-forming raw materials. In some embodiments, the total amount of kaolin clay may comprise less than about 20 wt % of the cordierite-forming raw materials. In further embodiments, the total amount of kaolin clay may comprise less than about 15 wt % of the cordierite-forming raw materials.

The organic material may comprise pore-forming materials, binders, surfactants, and lubricants. Pore-forming materials may include, but is not limited to, a starch (e.g., corn, barley, bean, potato, rice, tapioca, pea, sago palm, wheat, canna, and walnut shell flour), polymers (e.g., polybutylene, polymethylpentene, polyethylene (preferably beads), polypropylene (preferably beads), polystyrene, polyamides (nylons), epoxies, ABS, Acrylics, and polyesters (PET)), hydrogen peroxides, or a phenol resin. In one embodiment, the pore-forming material is a starch comprising corn, barley, bean, potato, rice, tapioca, pea, sago palm, wheat, canna, or walnut shell flour.

In some embodiments, the organic material may comprise at least one pore-forming material. In other embodiments, the organic material may comprise at least two pore-forming materials. In further embodiments, the organic material may comprise at least three pore-forming materials. For example, a combination of a polymer and a starch may be used. In another embodiment, a combination of starch and starch may be used. In a further embodiment, a combination of a polymer and a polymer may be used.

The pore forming agent may be present in any amount effective to provide a desired amount of porosity in the cordierite body. In one embodiment, the pore forming agent may be present at from about 0.5 wt % to about 12 wt %. In another embodiment, the pore forming agent may be present at from about 7 wt % to about 10 wt %.

Binders may include, but are not limited to, cellulose-containing components. Exemplary cellulose-containing components include, for example, methylcellulose, ethylhydroxy ethylcellulose, hydroxybutyl methylcellulose, hydroxymethylcellulose, hydroxypropyl methylcellulose, hydroxyethyl methylcellulose, hydroxybutylcellulose, hydroxyethylcellulose, hydroxypropylcellulose, sodium carboxymethylcellulose, carboxyl methylcellulose, and combinations thereof.

Surfactants and lubricants may be added to form the green body as long as they do not cause decomposition of the pore forming agent while forming the green body. Non-limiting embodiments of surfactants that may be used include $C_8$ to $C_{22}$ fatty acids and/or their derivatives. Additional surfactant components that may be used with these fatty acids are $C_8$ to $C_{22}$ fatty esters, $C_8$ to $C_{22}$ fatty alcohols, salt of fatty acids (such as sodium salt of stearic acid), and combinations thereof. Exemplary surfactants are stearic acid, lauric acid, oleic acid, linoleic acid, palmitoleic acids, sodium stearate, and their ester or alcohol derivatives. In some embodiments, the surfactant may be lauric acid, stearic acid, oleic acid, their ester or alcohol derivatives, and combinations thereof. The amount of surfactants may range from about 0.5 wt % to about 2 wt %.

Non-limiting embodiments of lubricants may include, but is not limited to, light mineral oil, corn oil, high molecular weight polybutenes, polyol esters, a blend of light mineral oil and wax emulsion, a blend of paraffin wax in corn oil, and combinations thereof. The amount of lubricant may range from about 0.2 wt % to about 10 wt %. In some embodiments, the amount of lubricant is in a range from about 0.7 wt % to about 2 wt %.

Solvents may be added to form the green body, and may include aqueous-based solvents, such as water or water-miscible solvents. In some embodiments, the solvent is water. The amount of aqueous solvent present may range from about 20 wt % to about 50 wt %.

The cordierite-forming raw materials and organic materials may be mixed to form a batch. The batch may be made by conventional techniques. By way of example, the cordierite-forming raw materials may be combined as powdered materials and intimately mixed to form a substantially homogeneous batch. The organic materials and/or solvent may be mixed with the cordierite-forming raw materials individually, in any order, or together to form a substantially homogeneous batch. Of course, other suitable steps and conditions for combining and/or mixing cordierite-forming raw materials and organic materials together to produce a substantially homogeneous batch may be used. For example, the cordierite-forming raw materials and organic materials may be mixed by a kneading process to form a substantially homogeneous batch.

The batch may be shaped into a green body by conventional forming processes. For example, the batch may be formed by extrusion, injection molding, slip casting, centrifugal casting, pressure casting, dry pressing, or similar forming processes.

In the embodiments described herein, the batch composition is formed or otherwise shaped into a honeycomb configuration. For example, the green honeycomb body may be a cylinder having end surfaces with a shape of a circle or an ellipse, a prism having the end surfaces with a shape of a polygon, such as a triangle or a square, a shape in which the sides of the cylinder and prism are bent like a "doglegged shape." The shape of the through holes in the body is not particularly limited. For example, the sectional shape may be a polygon, such as a square, a hexagon, an octagon, a circle, an ellipse, a triangle, or other shapes or combinations. It should however be understood that the particular desired size and shape of the ceramic article can depend on the application, e.g., in automotive applications by engine size and space available for mounting, etc.

The green body may be formed into a cordierite body having a diameter ranging from about 8 in (about 203 mm) to about 14 in (about 355 mm). In some embodiments, the green body may be formed into a cordierite body having a diameter ranging from about 11 in (about 280 mm) to about 14 in (about 355 mm). In other embodiments, the green body may be formed into a cordierite body having a diameter ranging from about 13 in (about 330 mm) to about 14 in (about 355 mm). The green body may be formed into a cordierite body having a height ranging from about 8 in (about 203 mm) to about 19 in (about 483 mm). In some embodiments, the green body may be formed into a cordierite body having a height ranging from about 9 in (about 228 mm) to about 18 in (about 457 mm). In further embodiments, the green body may be formed into a cordierite body having a height ranging from about 11 in (about 280 mm) to about 17 in (about 432 mm). In some embodiments, the green body may be formed into a cordierite body having a volume ranging from about 6,600 cm³ to about 47,950 cm³. In some embodiments, the green body may have a volume ranging from about 15,500 cm³ to about 45,400 cm³. In other embodiments, the green body has a volume ranging from about 26,100 cm³ to about 37,500 cm³. In further embodiments, the green body has as a volume ranging from about 36,900 cm³ to about 37,100 cm³.

Following shaping, the green body may optionally be dried by conventional methods to remove excess water or liquid present. The dried cordierite-forming green body may then be introduced into a furnace or kiln, where the green body is passed through a pre-heat temperature zone in the kiln at a pre-heat temperature, through a first heating zone in the kiln at a low firing temperature, through a second heating zone in the kiln at a high firing temperature, and a third heating zone in the kiln to sinter and form the desired physical properties of the cordierite ceramic body. In embodiments described herein, the green body is fired at a reduced time schedule to form a cordierite ceramic body, as will be described in further detail herein.

Figure 2:
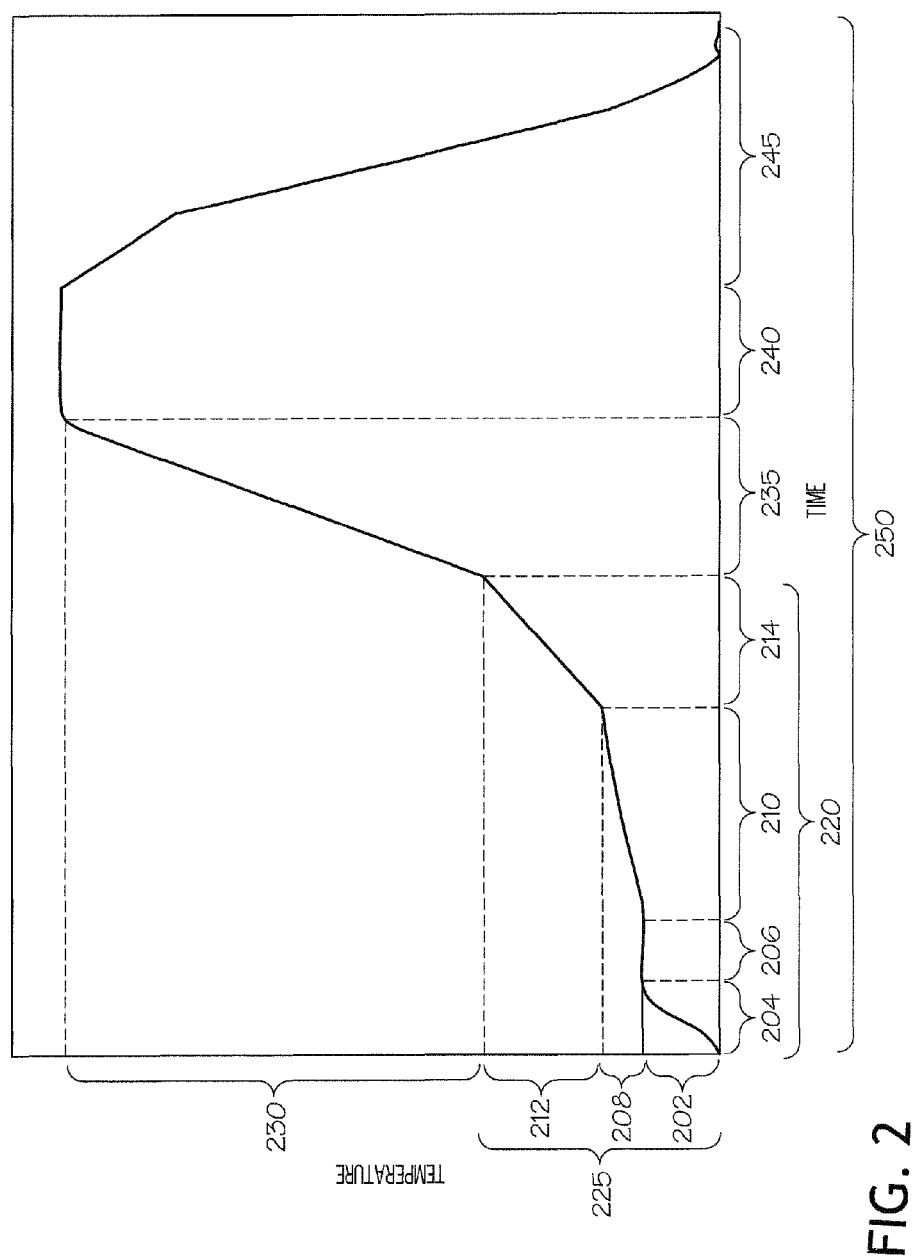
FIG. 2 graphically depicts a plot of the time (x-axis) versus temperature (y-axis) of an exemplary method of firing cordierite bodies according to one or more embodiments shown and described herein.

Referring now to FIG. 2, one exemplary firing schedule for firing a green cordierite body into a cordierite ceramic body is schematically depicted. Firing the green body according to this schedule generally comprises providing a green body; pre-heating the green body to a pre-heat temperature (202) for a period of time (204); maintaining the green body at the pre-heat temperature (202) for a specified period of time (206) to equilibrate the temperature between the core portion and the skin portion of the green body; heating the green body from the pre-heat temperature (202) to a low firing temperature (208) for a period of time (210) to reduce the organic material content in a skin portion; and heating the green body from the low firing temperature (208) to a high firing temperature (212) for a period of time (214) to reduce the organic material content in a core portion prior to removal of chemically bound water from clay present in the green body. Each portion of the firing schedule will be described in more detail below.

Initially, the green body is preheated to a pre-heat temperature (202) within the furnace or kiln. In some embodiments, the green body may be preheated at a ramp rate from about 6° C./hr to about 50° C./hr. In other embodiments, the green body is preheated at a ramp rate from about 10° C./hr to about 45° C./hr. In further embodiments, the green body is preheated from room temperature to a pre-heat temperature at a ramp rate from about 15° C./hr to about 40° C./hr.

As noted above, the green body comprises cordierite-forming raw materials and organic material. Accordingly, in some embodiments, the pre-heat temperature may be less than a thermal decomposition temperature of the organic material (e.g., the binder and pore-former) present in the green body. The thermal decomposition temperature of the organic material is the temperature at which an organic material degrades under applied heat. Where more than one organic material is present in the green body, the thermal decomposition temperature of the organic material may be the lowest thermal decomposition temperature of all organic materials present in the green body. The thermal decomposition temperature for organic material generally corresponds to the temperature at which the material starts to burn and may range from about 190° C. to about 300° C., and is dependent on heating rates and oxygen concentration. In some embodiments, the thermal decomposition temperature for organic material can range from about 190° C. to about 250° C. In further embodiments, the thermal decomposition temperature for organic material can range from about 190° C. to about 225° C.

The pre-heat temperature is below the lowest thermal decomposition temperature for all organic materials present in the green body. In some embodiments the pre-heat temperature is no more than 70° C. below a thermal decomposition temperature of the organic material. In other embodiments, the pre-heat temperature is no more than 50° C. below a thermal decomposition temperature of the organic material. In further embodiments, the pre-heat temperature is no more than 25° C. below a thermal decomposition temperature of the organic material. In even further embodiments, the pre-heat temperature is at least about 10° C. below a thermal decomposition temperature of the organic material. In even further embodiments, the pre-heat temperature is at least about 20° C. below a thermal decomposition temperature of the organic material.

In some embodiments described herein, the pre-heat temperature is generally in a range from about 150° C. to about 200° C. In other embodiments, the pre-heat temperature may be in a range from about 160° C. to about 190° C. In further embodiments, the pre-heat temperature may be in a range from about 170° C. to about 190° C.

Pre-heating of the green body occurs for a predetermined period of time (204) as shown in FIG. 2. In some embodiments, the pre-heat temperature is reached in a time period of less than about 14 hours. In other embodiments, the pre-heat temperature may be reached in a time period of less than about 6 hours. In further embodiments, the pre-heat temperature may be reached in a time period of less than about 5 hours.

As the green body is heated, a temperature differential may occur between the core portion and the skin portion. Thus, upon reaching the pre-heat temperature (202), the green body is maintained at the pre-heat temperature (202) for a period of time (206) sufficient to minimize the temperature differential between the core portion and the skin portion. In some embodiments the green body may be maintained at the pre-heat temperature for a period of time such that the temperature differential between the core portion and the skin portion is less than about 70° C. In other embodiments, the green body may be maintained at the pre-heat temperature for a period of time such that the temperature differential between the core portion and the skin portion is less than about 50° C. In further embodiments, the green body may be maintained at the pre-heat temperature for a period of time such that the temperature differential between the core portion and the skin portion is less than about 25° C.

In order to achieve the desired temperature differential between the core portion and the skin portion, the green body may be maintained at the pre-heat temperature for a period of time ranging from about 2 hours to about 10 hours. In some embodiments, the green body may be maintained at the pre-heat temperature for a period of time ranging from about 2 hours to about 8 hours. In other embodiments, the green body may be maintained at the pre-heat temperature for a period of time ranging from about 4 hours to about 8 hours.

Still referring to FIG. 2, after the desired temperature differential between the core portion and the skin portion is reached, the green body is heated for a time period (210) from the pre-heat temperature (202) to a low firing temperature (208) in a firing atmosphere sufficient to burn organic material from the skin portion of the green body and to substantially remove chemically bound water from hydrous alumina. Burning of organic materials can include both organic material and partially decomposed organic material (i.e., char). During the burning of organic materials, char formation occurs wherein partially decomposed organic material (i.e., char) and volatiles are formed and char removal occurs wherein the char is burned off. In some embodiments, the low firing temperature is in a range from about 250° C. to about 330° C. In other embodiments, the low firing temperature is in a range from about 270° C. to about 310° C.

The burning of organic materials is typically a highly exothermic reaction. Accordingly, the first temperature average ramp rate and the oxygen levels in the furnace are controlled to avoid excessive heat generation (and therefore, high temperatures) in the skin portion. Without being bound by theory, it is believed that when the first temperature average ramp rates and/or oxygen levels are too high, the high temperatures and/or the excess oxygen promotes the fast burning of organic materials in the skin portion, which, in turn, evolves large amounts of heat. The excess heat generated tends to increase the temperature of the skin portion causing a large thermal differential between the skin portion and core portion, which may lead to cracking. However, temperature ramp rates and/or oxygen levels that are too low can lengthen the cycle time, and may not burn off a sufficient amount of char prior to later process steps.

Conversely, the removal of chemically bound water from hydrous alumina tends to be an endothermic reaction. Large temperature differentials between the skin portion and core portion can occur due to excessive heat absorption. In addition, removal of chemically bound water from hydrous alumina can result in a dimensional change in the green body. Thus, it can be important to manage alumina dehydration as it could indirectly affect cracking as water vapor from the hydrous alumina can suppress oxidation of the char present in the core.

Heating from the pre-heat temperature to the low firing temperature is performed at a first temperature average ramp rate that is less than about 12° C./hour. In some embodiments, heating is performed at a first temperature average ramp rate that is less than about 7° C./hour. In further embodiments, heating is performed at a first temperature average ramp rate that is less than about 5° C./hour. The first temperature average ramp rates described herein can avoid the fast burning of organic materials, can avoid fast removal of chemically bound water from alumina, and/or avoid formation of a large char region that may result in high stresses within the green body in subsequent heating steps. Thus, uncontrolled first temperature average ramp rates and oxygen levels when heating to the low firing temperature can ultimately lead to cracking. The firing atmosphere may contain a first oxygen concentration to control the oxygen levels, and therefore the burning rate of organic materials. In some embodiments, the first oxygen concentration may range from about 11% to about 14%. In other embodiments, the first oxygen concentration may range from about 12% to about 13%. The balance of the firing atmosphere gases may include $CO_2$, CO, $H_2O$, $N_2$ and other air constituents.

The green body may be heated from the pre-heat temperature to a low firing temperature (208) such that a maximum temperature of the skin portion is controlled. In some embodiments, the maximum temperature of the skin portion may be less than or equal to about 300° C. as the part is heated to about 280° C. In some embodiments, the maximum temperature of the skin portion is less than or equal to about 290° C. as the part is heated to about 280° C. The green body may also be heated to a low firing temperature (208) such that a temperature differential between the skin portion and core portion is minimized. In some embodiments, the green body is heated to a low firing temperature such that the temperature differential is less than about 70° C. In other embodiments, the green body is heated to a low firing temperature such that the temperature differential between the skin portion and core portion is less than about 50° C. In further embodiments, the green body is heated to a low firing temperature such that the temperature differential between the skin portion and core portion is less than about 40° C.

In some embodiments, the green body is heated to the low firing temperature (208) for a period of time (210) sufficient to reduce the organic material content in the body and to substantially remove chemically bound water from hydrous alumina. In some embodiments, the green body may be heated to the low firing temperature for a period of time sufficient to reduce the organic material content. The organic material content can include both organic material and partially decomposed organic material (e.g., char). In some embodiments, the period of time sufficient to reduce the organic material content and to substantially remove chemically bound water from hydrous alumina in less than about 40 hours. In other embodiments, the period of time sufficient to reduce the organic material content and to substantially remove chemically bound water from hydrous alumina in less than about 35 hours. In some examples, substantially all of the chemically bound water from hydrous alumina is removed.

After the green body is heated to the low firing temperature, the green body may then be heated for a time period (214) from the low firing temperature (208) to a high firing temperature (210) in a firing atmosphere suitable for burning organic materials from the core portion of the green body and substantially removing chemically bound water from clay present in the green body. In some examples, substantially all of the chemically bound water from clay is removed. In some embodiments, the high firing temperature is in a range from about 500° C. to about 700° C. In other embodiments, the high firing temperature is in a range from about 550° C. to about 650° C. In further embodiments, the high firing temperature is in a range from about 575° C. to about 625° C.

The burning of organic materials is typically a highly exothermic reaction, while the removal of chemically bound water from clay is typically endothermic. Accordingly, the second temperature average ramp rate and oxygen levels are controlled to avoid excessive heat generation (and therefore high temperatures) in the core portion and excessive heat absorption. Without being bound by theory, it is believed that when the second temperature average ramp rates are too low or oxygen levels are too high, the organic materials in the core portion burn fast, thereby releasing large amounts of heat. The excess heat generated tends to increase the temperature of the core portion beyond the temperature of the skin portion, which, in turn, may lead to cracking. Similarly, heat absorption in the core portion during removal of chemically bound water from clay tends to increase the lag with respect to the skin portion. Cracking may also occur where unburnt char is present in the core portion. Char can increase the stiffness (elastic modulus) of the green body, and where present in the core portion, the core portion can be four times the stiffness of the skin portion. The differential in stiffness between the core portion and skin portion can substantially increase and/or amplify stresses present in the green body leading to cracking. Ultimately, the combination of temperature differentials and chemistry differentials (i.e., char present in the core portion) lead to shrinkage and stiffness that causes cracking from high stresses. Accordingly, it is believed that temperature ramp rates and oxygen levels when heating the green body from the low firing temperature to the high firing temperature can be controlled to avoid excessive temperature differentials due to burning of organic materials and dehydration of clay or stiffness and/or shrinkage differentials due to unburnt char. Thus, the green body must have substantially all char removed by burning (i.e., a sufficiently low organic material content), including, substantial removal of char from the skin portion, prior to the substantial removal of chemically bound water from clay.

The green body is generally heated to a high firing temperature (212) at a second temperature average ramp rate. In some embodiments, the second temperature average ramp rate may range from about 7° C./hour to about 40° C./hour. In other embodiments, heating is performed at a second temperature average ramp rate in a range from about 7° C./hour to about 30° C./hour. As the body is heated to the high firing temperature, the firing atmosphere contains a second oxygen concentration. In some embodiments, the second oxygen concentration is greater than the first oxygen concentration. In other embodiments, the second oxygen concentration may range from about 14% to about 18%. In further embodiments, the second oxygen concentration may range from about 14% to about 17%.

In some embodiments, the green body temperature may be heated from the low firing temperature to the high firing temperature at a second temperature average ramp rate such that a content of the organic material is substantially removed (i.e., substantially all char is removed), and heated at a third temperature average ramp rate such that chemically bound water from clay is substantially removed. In some embodiments, the third temperature average ramp rate is faster than the second temperature average ramp rate. In some embodiments, the second temperature average ramp rate is from about 5° C./hour to about 40° C./hour. In other embodiments, the second temperature average ramp rate is from about 7° C./hour to about 25° C./hour. The second temperature average ramp rate heats the green body from a low firing temperature to a temperature from about 350° C. to about 450° C. such that the content of the organic material is substantially removed. In some embodiments, the third temperature average ramp rate is from about 10° C./hr to about 40° C./hr. In other embodiments, the third temperature average ramp rate is from about 20° C./hr to about 35° C./hr. The third temperature average ramp rate heats the green body from about 350° C. to about 450° C. to the high firing temperature such that chemically bound water from clay is substantially removed.

The green body may be heated to a high firing temperature (212) such that a temperature differential between the skin portion and core portion is minimized. In some embodiments, the temperature differential between the skin portion and core portion is less than about 70° C. as the green body is heated to the high firing temperature. In other embodiments, while the green body is heated to a high firing temperature, the temperature differential between the skin portion and core portion is less than about 50° C. In further embodiments, while the green body is heated to a high firing temperature, the temperature differential between the skin portion and core portion is less than about 40° C.

In some embodiments, the period of time sufficient to substantially remove the organic material content from the core portion and to remove chemically bound water from clay is less than about 17 hours. In other embodiments, the period of time sufficient to substantially remove the organic material content and to remove chemically bound water from clay is less than about 14 hours. The organic material content is reduced or substantially removed from the core portion prior to substantial removal of chemically bound water from clay.

The total amount of time (220) to heat the green body from room temperature to the high firing temperature (225) may range from about 40 hours to about 70 hours. In other embodiments, the total amount of time (220) to heat the green body to the high firing temperature (225) may range from about 47 hours to about 65 hours. In further embodiments, the total amount of time (220) to heat the green body to the high firing temperature (225) may range from about 55 hours to about 65 hours After the green body is heated to the high firing temperature, the green body may be further heated to a soak temperature (230) for a period of time (235) sufficient to form a cordierite body. The soak temperature is less than the melting point of cordierite (about 1450° C.). The soak temperature ramp rate may range from about 50° C./hr to about 100° C./hr. In some embodiments, soak temperature ramp rate may range from about 50° C./hr to about 75° C./hr. The green body may be held at the soak temperature for a time period (240) ranging from about 6 hours to about 20 hours to fire the body and thus form the cordierite body by converting the cordierite-forming raw materials in the body to cordierite. The actual length of the time period (240) can depend upon the size of the body. The cordierite body may then be cooled for a time period (245) to room temperature. In some embodiments, the total firing time (250) may range from about 90 hours to about 150 hours in length. In other embodiments, the total amount of firing time (250) may range from about 100 hours to about 140 hours. The substantially reduced total firing times can offer production efficiencies through shortened firing times for producing crack-free cordierite ceramic bodies.

Based on the foregoing, it should be understood that various methods for firing a green body to a cordierite ceramic body without cracking the body is disclosed. In a first exemplary embodiment, the methods may include providing a green body comprising cordierite-forming raw materials and organic material, the body having a core portion and a skin portion, pre-heating the green body to a pre-heat temperature that is less than a thermal decomposition temperature of the organic material, maintaining the green body at the pre-heat temperature for a period of time sufficient to obtain a temperature differential between the core portion and the skin portion of less than about 50° C., heating the green body at a first temperature average ramp rate from the pre-heat temperature to a low firing temperature in a firing atmosphere comprising a first oxygen concentration for a period of time sufficient to reduce a content of the organic material and to substantially remove chemically bound water from hydrous alumina, and heating the green body at a second temperature average ramp rate from the low firing temperature to a high firing temperature in a firing atmosphere comprising a second oxygen concentration that is greater than the first oxygen concentration for a period of time sufficient to reduce the content of the organic material, wherein the content of the organic material is substantially removed prior to a removal of chemically bound water from clay.

In a second exemplary embodiment, the method may include providing a green body comprising cordierite-forming raw materials and greater than or equal to about 10 wt % organic material, the green body having a core portion surrounded by a skin portion, pre-heating the green body to a pre-heat temperature at an pre-heat average ramp rate from about 6° C./hr to about 50° C./hr, wherein the pre-heat temperature is no more than 70° C. below a thermal decomposition temperature of the organic material, maintaining the green body at the pre-heat temperature for a time period from about 2 hours to about 8 hours such that a temperature differential between the core portion and the skin portion is minimized, heating the green body at a first temperature average ramp rate from the pre-heat temperature to a low firing temperature in a firing atmosphere comprising from about 9 wt % to about 15 wt % oxygen, wherein the low firing temperature is from about 270° C. to about 320° C., and the first temperature average ramp rate is equal to or less than about 7° C./hr, and heating the green body at a second temperature average ramp rate from the low firing temperature to a high firing temperature in a firing atmosphere comprising from about 12 wt % to about 18 wt % oxygen, wherein the high firing temperature is from about 500° C. to about 700° C., and the second temperature average ramp rate is from about 7° C./hr to about 40° C./hr to reduce a content of the organic material, wherein the content of the organic material is substantially removed prior to a removal of chemically bound water from clay.

In a third exemplary embodiment, the method may include providing a green body comprising cordierite-forming raw materials and greater than or equal to about 10 wt % organic material, the green body having a core portion surrounded by a skin portion, pre-heating the green body to a pre-heat temperature for a time period of less than about 7 hours, wherein the pre-heat temperature is no more than 70° C. below a thermal decomposition temperature of the organic material, maintaining the green body at the pre-heat temperature for a time period from about 2 hours to about 8 hours such that a temperature differential between the core portion and the skin portion is minimized, heating the green body for a time period from the pre-heat temperature to a low firing temperature in a firing atmosphere comprising from about 9% to about 15% oxygen, wherein the low firing temperature is from about 270° C. to about 320° C., and the time period is less than about 40 hours, and heating the green body for a time period from the low firing temperature to a high firing temperature in a firing atmosphere comprising from about 12% to about 18% oxygen, the firing atmosphere sufficient to substantially reduce a content of the organic material prior to removal of chemically bound water from clay, wherein the high firing temperature is from about 500° C. to about 700° C. and the time period is less than about 15 hours.

EXAMPLES

The following examples illustrate the features and advantages of the invention, and is no way intended to limit the invention thereto.

Inorganic powder batch mixtures, as listed in percent by weight, suitable for the formation of a ceramic body having cordierite as its primary crystalline phase are listed in Table I. The inventive and comparative compositions were formed by combining together the inorganic components, which include hydrous kaolin, talc, silica, calcined alumina, and hydrated alumina. Next, 4 wt % (based upon 100 wt % of the inorganic components) of a binder was added and mixed into the composition. Then, 10 wt (based upon 100 wt % of the inorganic components) of native superior potato starch (pore former) was added and mixed into the composition. Next, 1.0 wt % (based upon 100 wt % of the inorganic components) of lubricant was added and mixed into the composition. The resulting mixture was kneaded to obtain clay.

The obtained clay was formed into a cylinder shape, and then formed into a honeycomb shape using an extruder. The obtained honeycomb-formed product was subjected to microwave drying and then to hot air drying to obtain a dried honeycomb product or a green body. The green body was cut into a predetermined size.

The green bodies were then fired according to various firing schedules outlined below. The pre-heat temperature, low firing temperature and high firing temperature were determined using the mid-core (MC) thermocouple.

TABLE 1

|  | Wt. % |
|---|---|
| INORGANICS | |
| Talc | 40.6% |
| Silica | 14.4% |
| Hydrous Kaolin | 11.7% |
| Calcined Alumina | 14.7% |
| Hydrated Alumina | 18.6% |
| Totals | 100.0% |
| PORE FORMERS | |
| Native Superior Potato Starch | 10.0% |
| SOLID BINDERS/ORGANICS | |
| Methylcellulose - | 4.0% |
| Stearic Acid | 1.0% |

Comparative Example A

Figure 3:
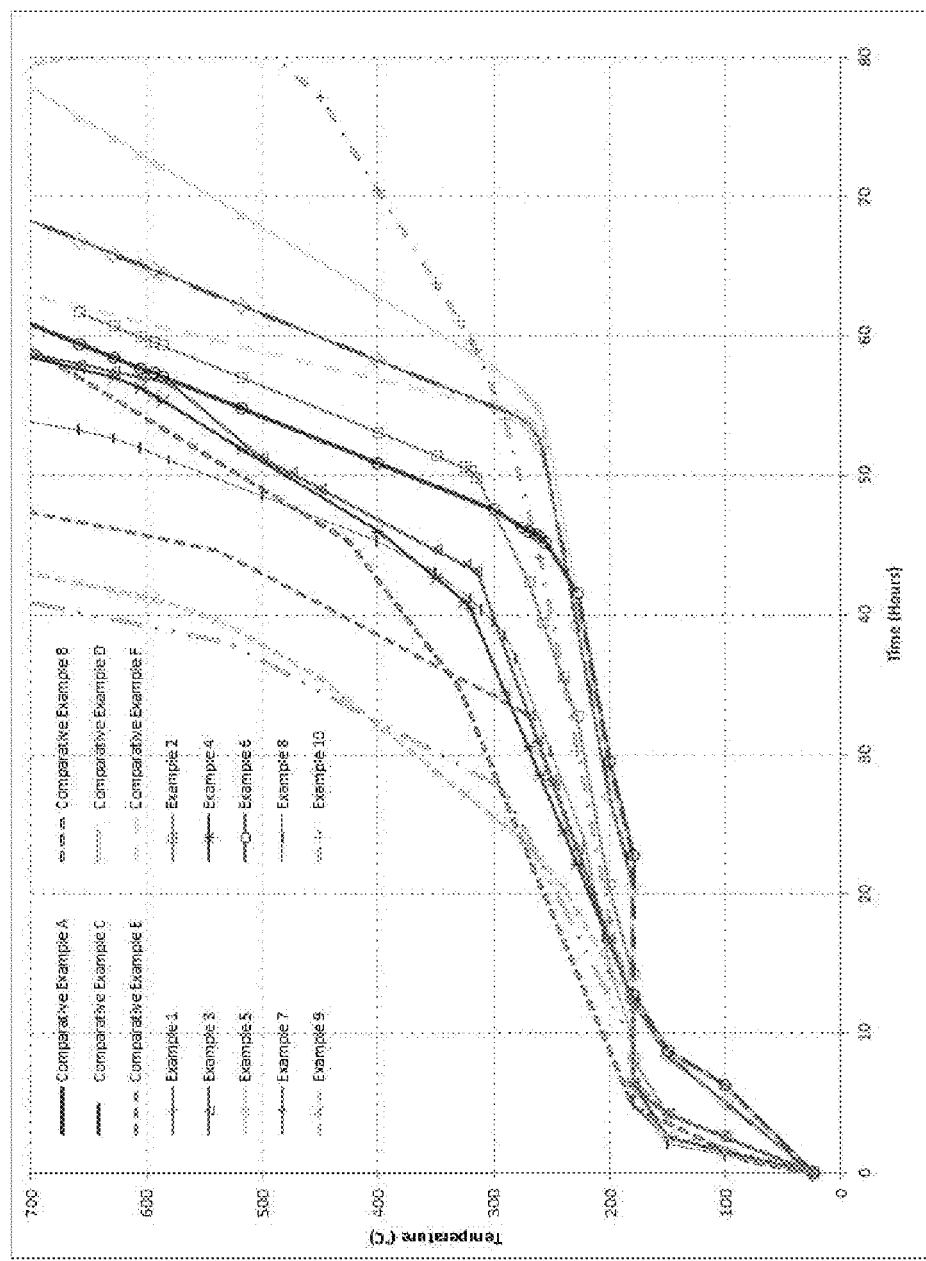
FIG. 3 graphically depicts a time (x-axis) versus temperature (y-axis) plot of various temperature ramp rate averages according to one or more embodiments shown and described herein.
Figure 4:
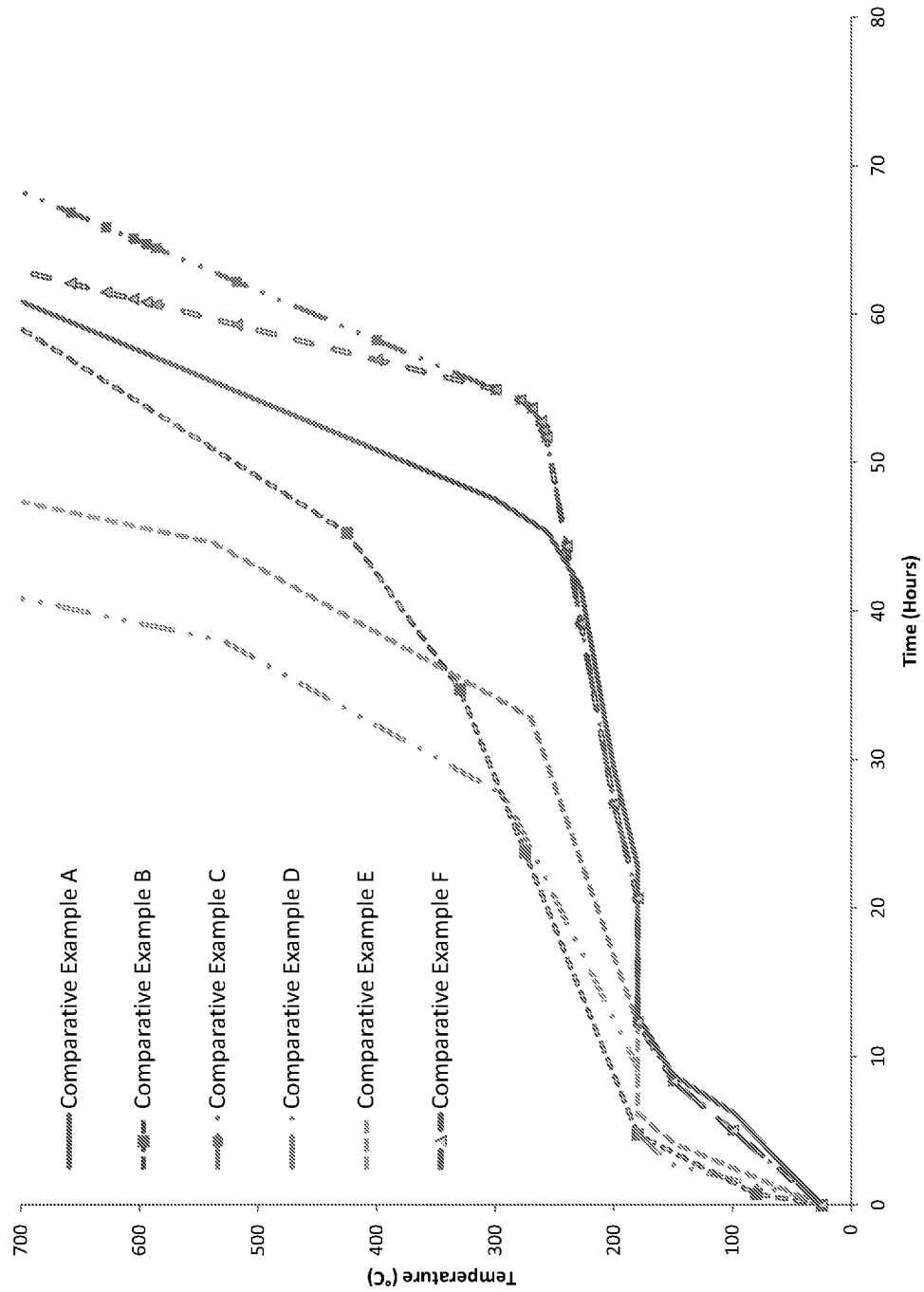
FIG. 4 graphically depicts a time (x-axis) versus temperature (y-axis) plot of various temperature ramp rate averages according the firing schedule of the comparative examples.
Figure 5:
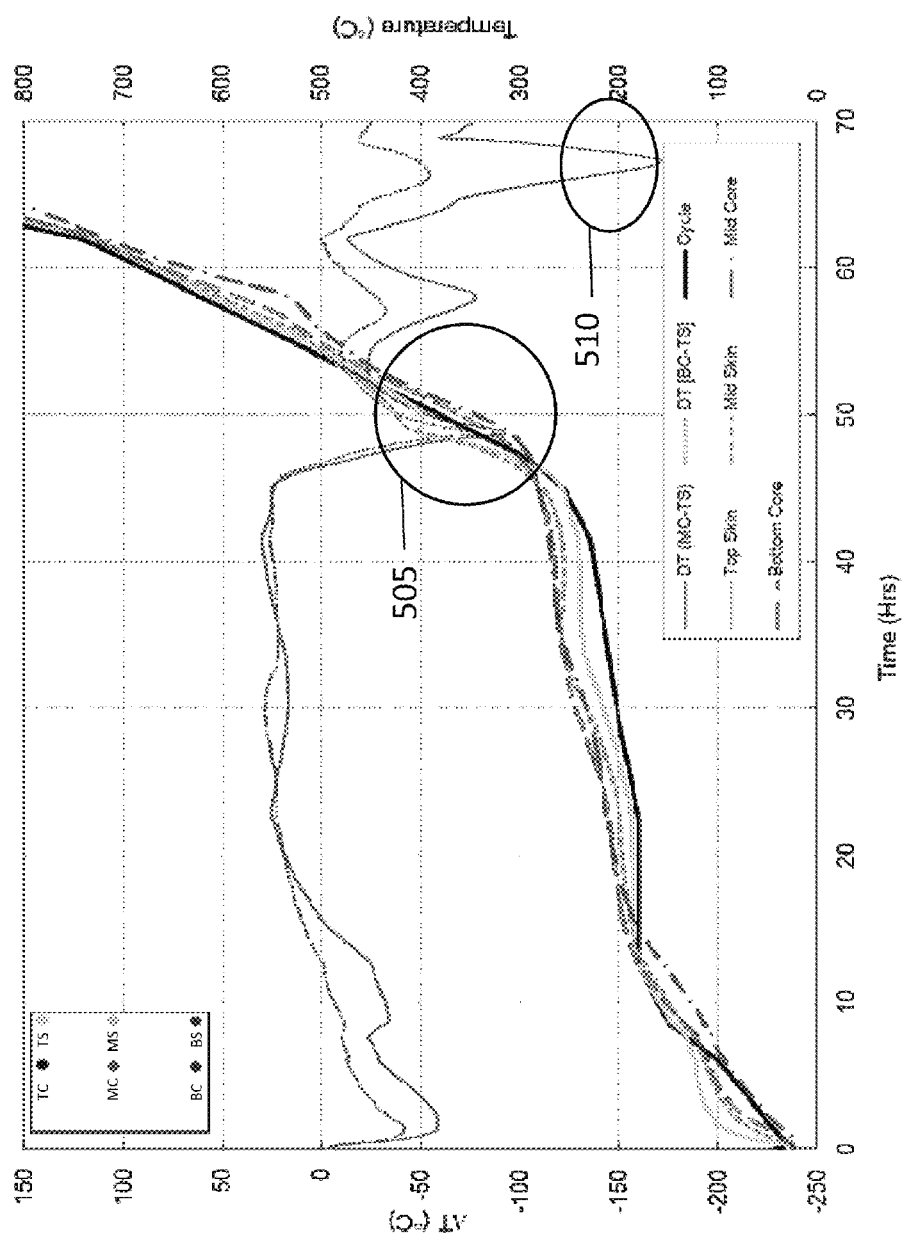
FIG. 5 graphically depicts a time (x-axis) versus temperature (y-axis) plot of various average temperature ramp rates according the firing schedule of comparative example A.

Five green bodies were formed as described above, and fired according to the schedule shown in Table 2. The green bodies were heated from room temperature to a pre-heat temperature of 180° C. at a ramp rate of about 12.16° C./hr. The green bodies were then held at the pre-heat temperature for about 10 hours. The green bodies had a temperature differential between the mid-core (MC) and top skin (TS) of about 23° C. after the pre-heat hold time. The green bodies were then heated from the pre-heat temperature of 180° C. to a low firing temperature of 255° C. The average ramp rate during this first temperature average ramp rate was 3.3° C./hr, as shown in FIGS. 3 and 4. The oxygen levels were at 12.2%. The temperature differential between the mid-core and top skin during alumina dehydration was 25.7° C. The green bodies were then heated from the low firing temperature of 255° C. to the high firing temperature of 700° C. at a second temperature average ramp rate of 28.4° C./hr. Referring to FIG. 5, the low temperature was not sufficient to complete alumina dehydration. The mid-core temperature of the fired green bodies lagged behind the top skin temperature during firing, and as a result, the temperature differential between the mid-core and the top skin (505) was about 85° C. The temperature ramp rate regime also did not successfully remove organic material, particularly, from the skin portion and caused excessive temperature differentials within the body resulted during clay dehydration reactions (510). As a result, 60% of the fired green bodies had cracking.

Figure 6:
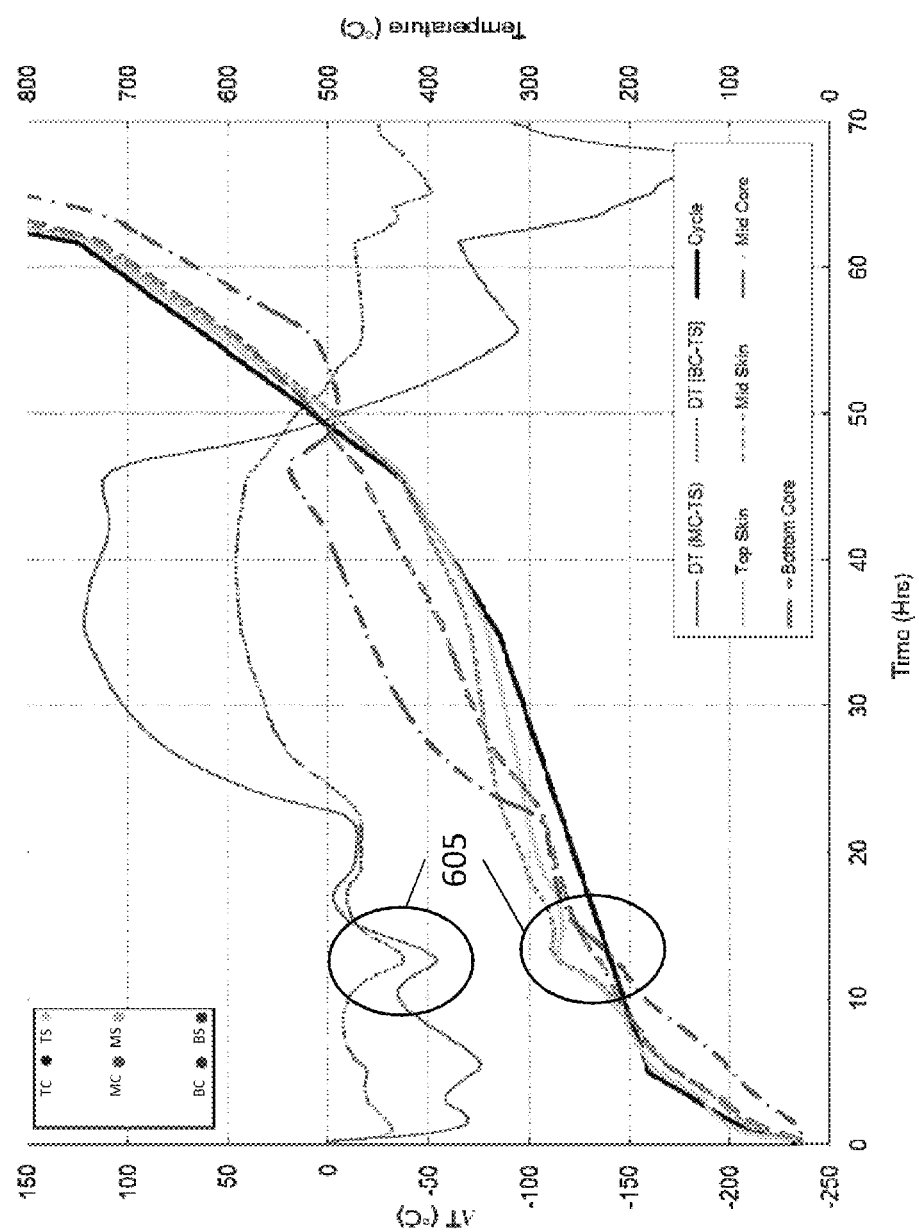
FIG. 6 graphically depicts a time (x-axis) versus temperature (y-axis) plot of various average temperature ramp rates according the firing schedule of comparative example B.
Figure 7:
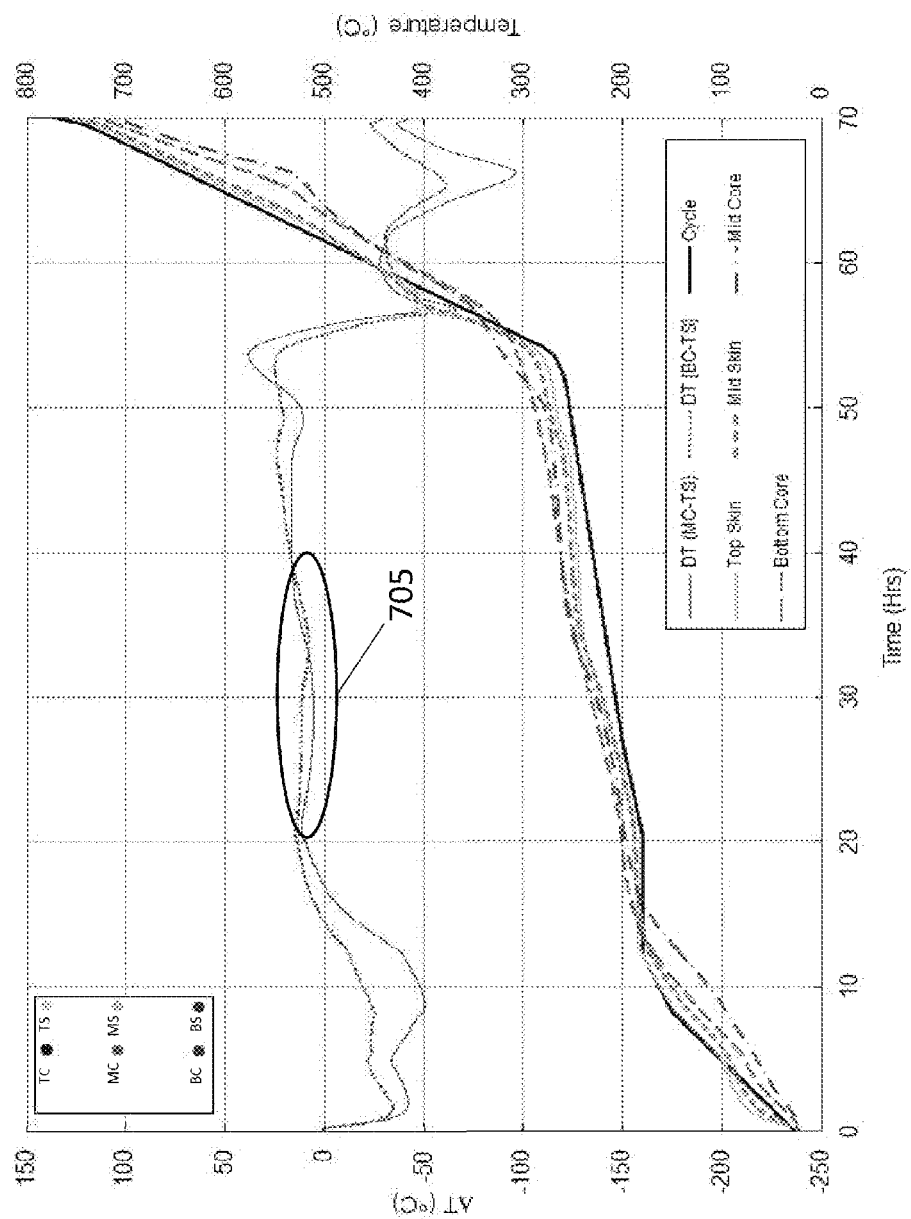
FIG. 7 graphically depicts a time (x-axis) versus temperature (y-axis) plot of various average temperature ramp rates according the firing schedule of comparative example C.

Comparative Example B 23 green bodies were formed as described above, and fired according to the schedule shown in Table 2. The green bodies were heated from room temperature to a pre-heat temperature of 180° C. at an average pre-heat temperature ramp rate of 32.7° C./hr. There was no hold time at the pre-heat temperature, and the temperature differential after the pre-heat was −53.8° C. The green bodies were then heated from the pre-heat temperature of 180° C. to a low firing temperature of 330° C. The average low firing temperature ramp rate was 5° C./hr as shown in FIGS. 3 and 4. The temperature differential between the mid-core and top skin during alumina dehydration was 118.8° C. Referring to FIG. 6, the lack of a pre-heat hold resulted in excessive burning of organics in the skin portion (605), which resulted in a temperature differential between the top skin and mid-core of −53° C. (605). The green bodies were then heated from the low firing temperature of 330° C. to the high firing temperature of 700° C. at a second average temperature ramp rate of 13.2° C./hr, which included an increase in ramp rates from 9 to 20° C./hr at 425° C. 43% of the fired green bodies had cracking Comparative Example C Five green bodies were formed as described above, and fired according to the schedule shown in Table 2 and in FIGS. 3 and 4. The green bodies were heated using a time temperature schedule similar to Example 1; however, the oxygen levels in the kilns were dropped to about 10.8% during the first temperature ramp. As shown in FIG. 7, this resulted in insufficient organic removal from the skin portion prior to clay dehydration. The pre-heat temperature differential between the mid-core and top skin was 8.6° C. (705), which is lower than in Example A, in part due to the lower oxygen levels. 60% of the fired green bodies had cracking.

Figure 8:
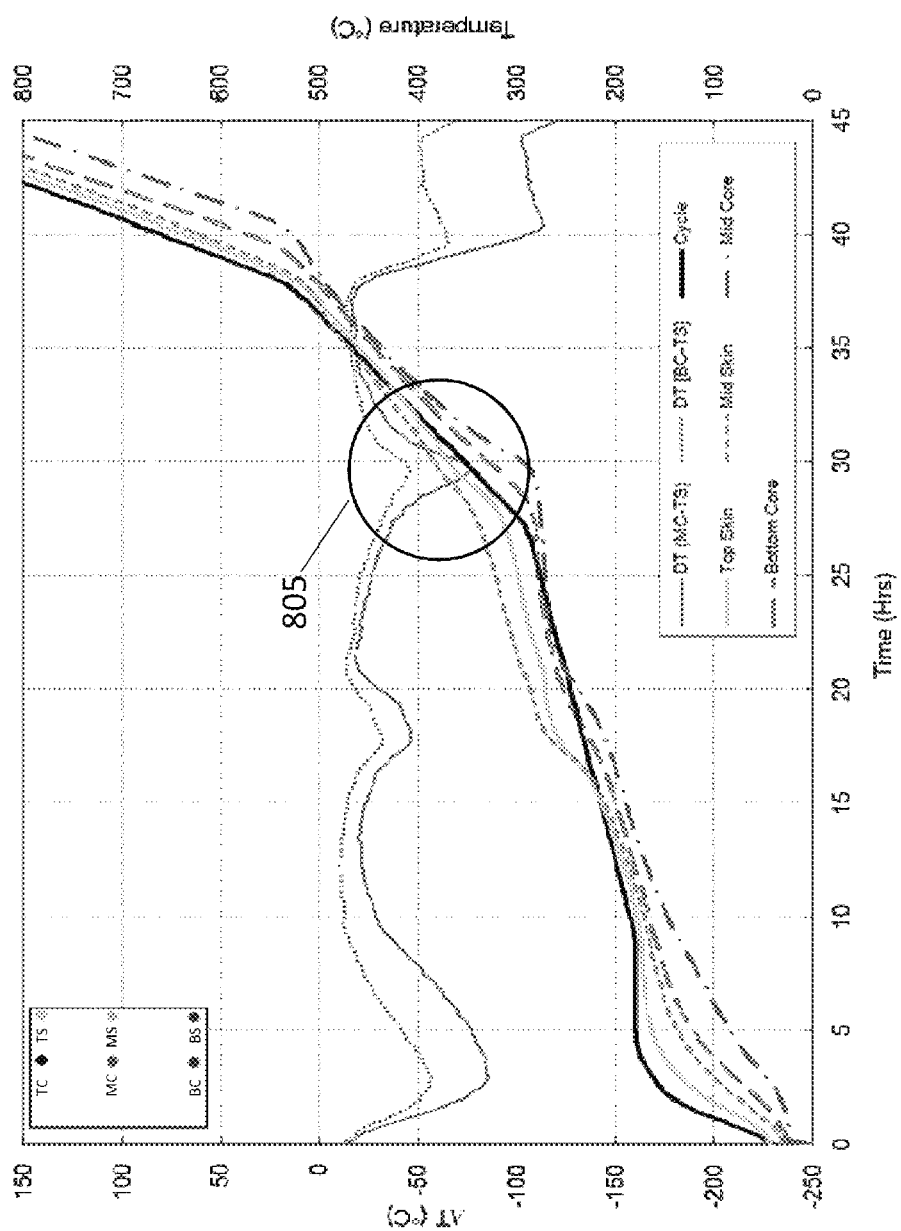
FIG. 8 graphically depicts a time (x-axis) versus temperature (y-axis) plot of various average temperature ramp rates according the firing schedule of comparative example D.

Comparative Example D 17 green bodies were formed as described above, and fired according to the schedule shown in Table 2. The green bodies were heated from room temperature to a pre-heat temperature of 180° C. at a ramp rate of about 32.9° C./hr. The green bodies were then held at the pre-heat temperature for about 4.5 hours. The green bodies had a temperature differential between the mid-core and top skin of about −34.8° C. after the pre-heat hold time. The green bodies were then heated from the pre-heat temperature of 180° C. to a low firing temperature of 292° C. The average ramp rate during this first temperature ramp regime was 6.1° C./hr as shown in FIG. 4. The oxygen levels in the kilns were dropped to about 10.5% during the first temperature ramp. The green bodies were then heated from the low firing temperature of 292° C. to the high firing temperature of 700° C. at a second temperature average ramp rate of 30.7° C./hr. Referring to FIG. 8, the low temperature was not sufficient to complete the alumina dehydration and a very high temperature differential of −76.4° C. (805) resulted during alumina dehydration. 94% of the fired green bodies had cracking.

Figure 9:
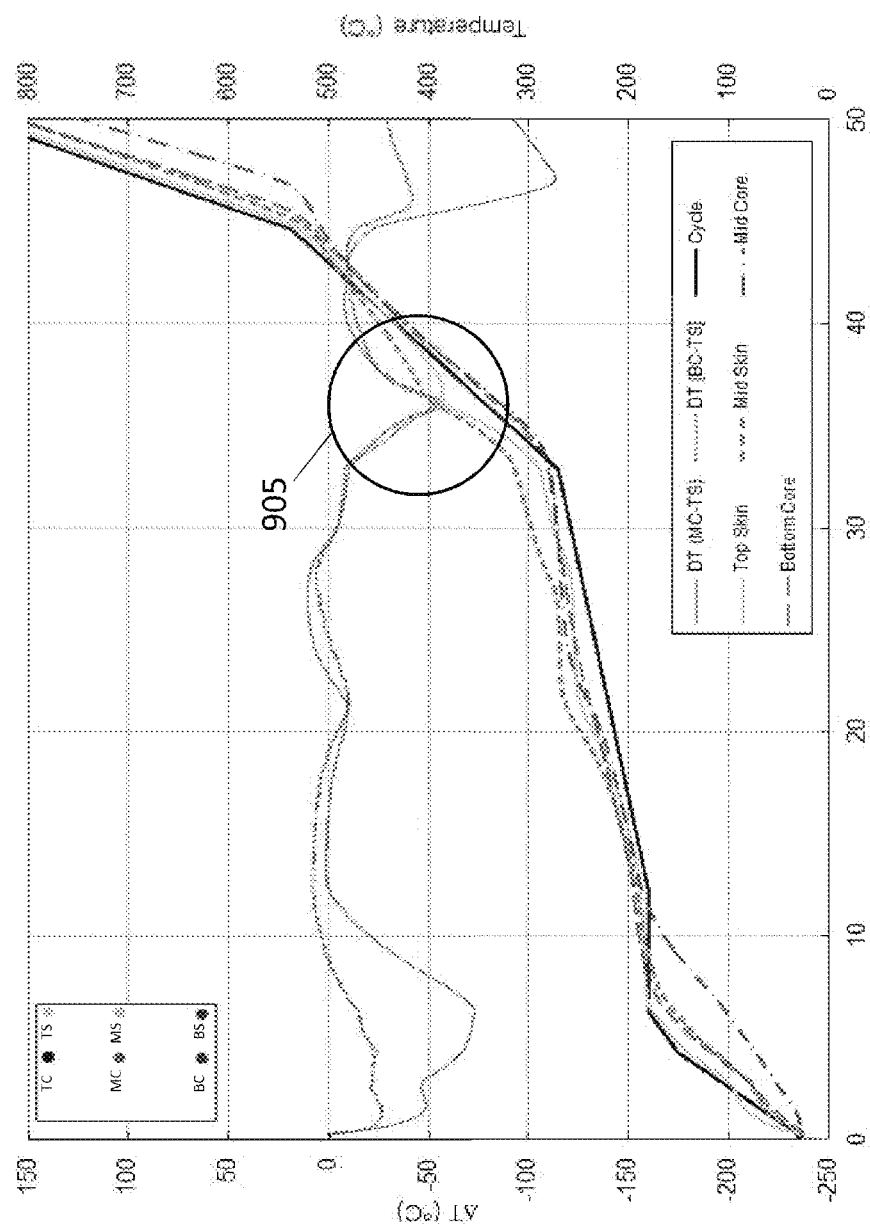
FIG. 9 graphically depicts a time (x-axis) versus temperature (y-axis) plot of various average temperature ramp rates according the firing schedule of comparative example E.

Comparative Example E 38 green bodies were formed as described above, and fired according to the schedule shown in Table 2. The green bodies were heated from room temperature to a pre-heat temperature of 180° C. at a ramp rate of about 25.14° C./hr. The green bodies were then held at the pre-heat temperature for about 6 hours. The green bodies had a temperature differential between the mid-core and top skin of about 1° C. after the pre-heat hold time. The green bodies were then heated from the pre-heat temperature of 180° C. to a low firing temperature of about 270° C. The first temperature ramp rate during the burning of organics in the skin portion and during alumina dehydration was about 4.36° C./hr as shown in FIGS. 3 and 4. The temperature differential between the mid-core and top skin during alumina dehydration was −8.5° C. The green bodies were then heated from the low firing temperature of 270° C. to the high firing temperature of 700° C. at a second temperature average ramp rate of 29.5° C./hr as shown in FIGS. 3 and 4. As shown in FIG. 9, the low temperature was not sufficient to complete alumina dehydration (905), and upon firing to a high temperature, large temperature differentials resulted. 18% of the green bodies had cracks.

Comparative Example F

Figure 10:
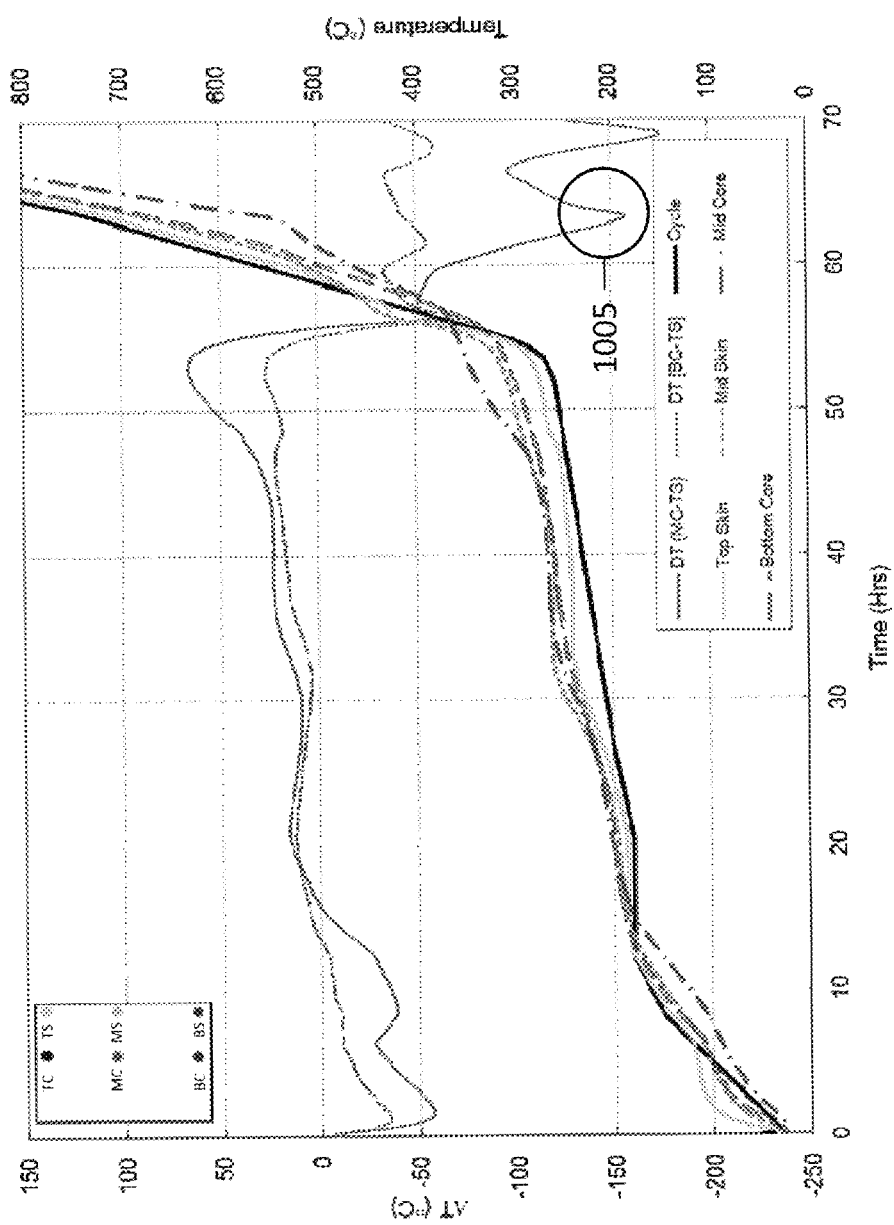
FIG. 10 graphically depicts a time (x-axis) versus temperature (y-axis) plot of various average temperature ramp rates according the firing schedule of comparative example F.

Five green bodies were formed as described above, and fired according to the schedule shown in Table 2. The green bodies were heated to the low firing temperature using a time temperature schedule similar to Example 1. The green bodies had a temperature differential between the mid-core and top skin of about 1° C. after the pre-heat hold time, and about 22.8° C. during alumina dehydration. The green bodies were then heated from the low firing temperature of 269° C. to the high firing temperature of 700° C. at a second temperature average ramp rate of 46.6° C./hr as shown in FIGS. 3 and 4, which included an increase in ramp rates from 12.6° C./hr at 269° C. to 30° C./hr at 279° C. to 50° C./hr at 300° C. The second average temperature ramp rate was higher than in Example 1 and such high ramp rates during the second temperature ramp caused insufficient organic removal in the core portion prior to clay dehydration. As a result, referring to FIG. 10, the temperature differential during clay dehydration significantly increased (1005). 60% of the fired green bodies had cracking.

TABLE 2

| Cycle ID | RT to PH Temp Ramp Rate (° C./hr) | PH time (hr) | Low T (° C.) | PH Temp to Low T Ramp Rate | PH to Low T O₂ | Low T to High T (° C.) | Low T to High T Ramp Rate (° C./hr) | Low T to High T O₂ | % Crack Results | Pre-heat DT @ PH Temp | Alumina DT @ Low Temp |
|---|---|---|---|---|---|---|---|---|---|---|---|
| Comparative Example A | 12.16 | 10 | 255 | 3.3 | 12.2% | 700 | 28.4 | 13.5% | 60% | 23 | 25.7 |
| Comparative Example B | 32.75 | 0 | 330 | 5.00 | 19.49% | 700 | 13.2 | 17.2% | 43% | −53.8 | 118.8 |
| Comparative Example C | 12.57 | 8.3 | 269 | 2.69 | 10.79% | 700 | 29.57 | 11.08% | 60% | 8.6 | 10.6 |
| Comparative Example D | 32.88 | 4.5 | 292 | 6.10 | 10.50% | 700 | 30.74 | 13.10% | 94% | −34.8 | −76.4 |
| Comparative Example E | 25.14 | 6 | 270 | 4.36 | 12.50% | 700 | 29.54 | 12.85% | 18% | 1 | −8.5 |
| Comparative Example F | 12.57 | 8.3 | 269 | 2.69 | 13.30% | 700 | 46.64 | 13.10% | 60% | 14.4 | 22.8 |

Example 1

Figure 11:
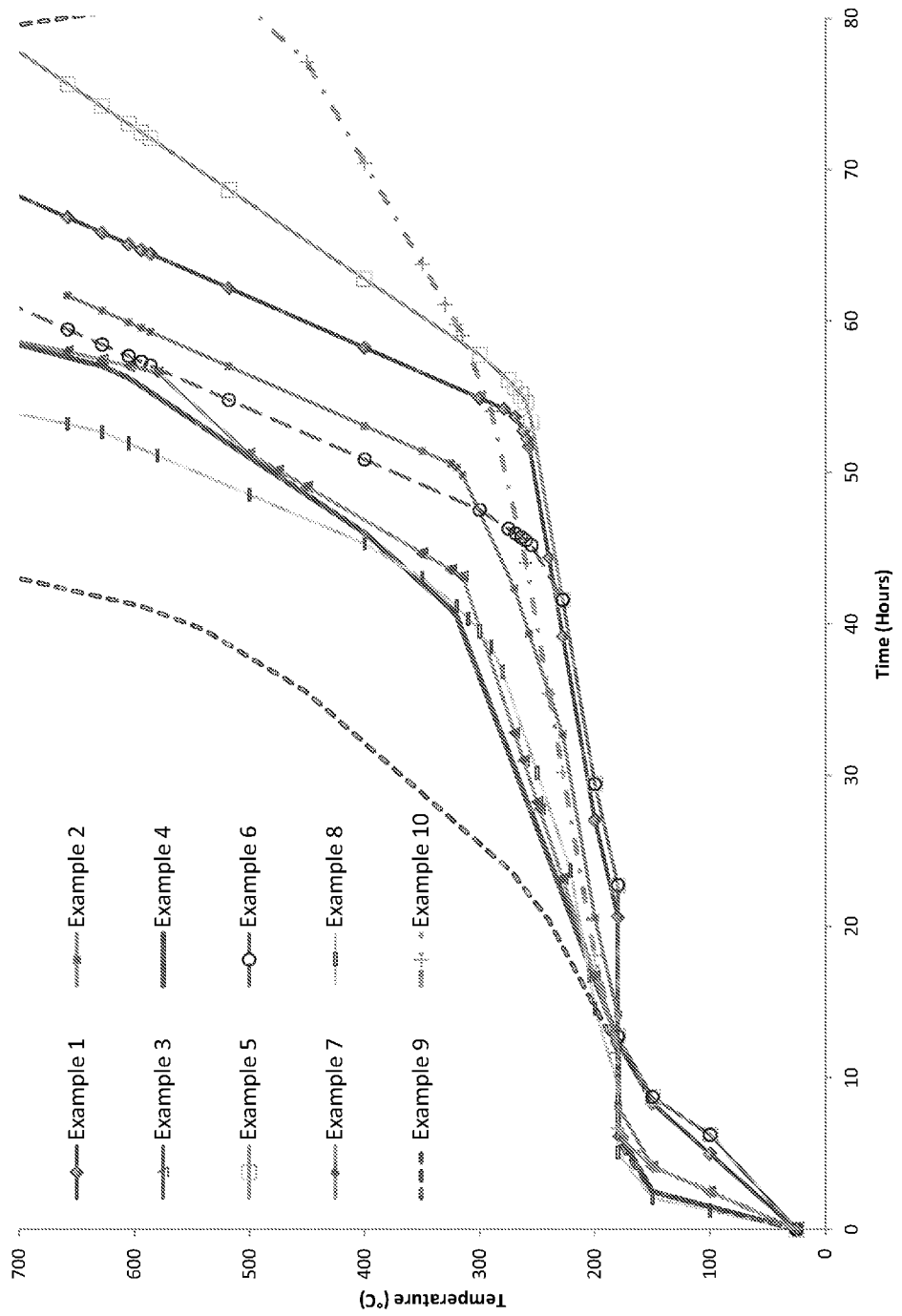
FIG. 11 graphically depicts a time (x-axis) versus temperature (y-axis) plot of various average temperature ramp rates for the firing schedule of the examples according to one or more embodiments shown and described herein.
Figure 12:
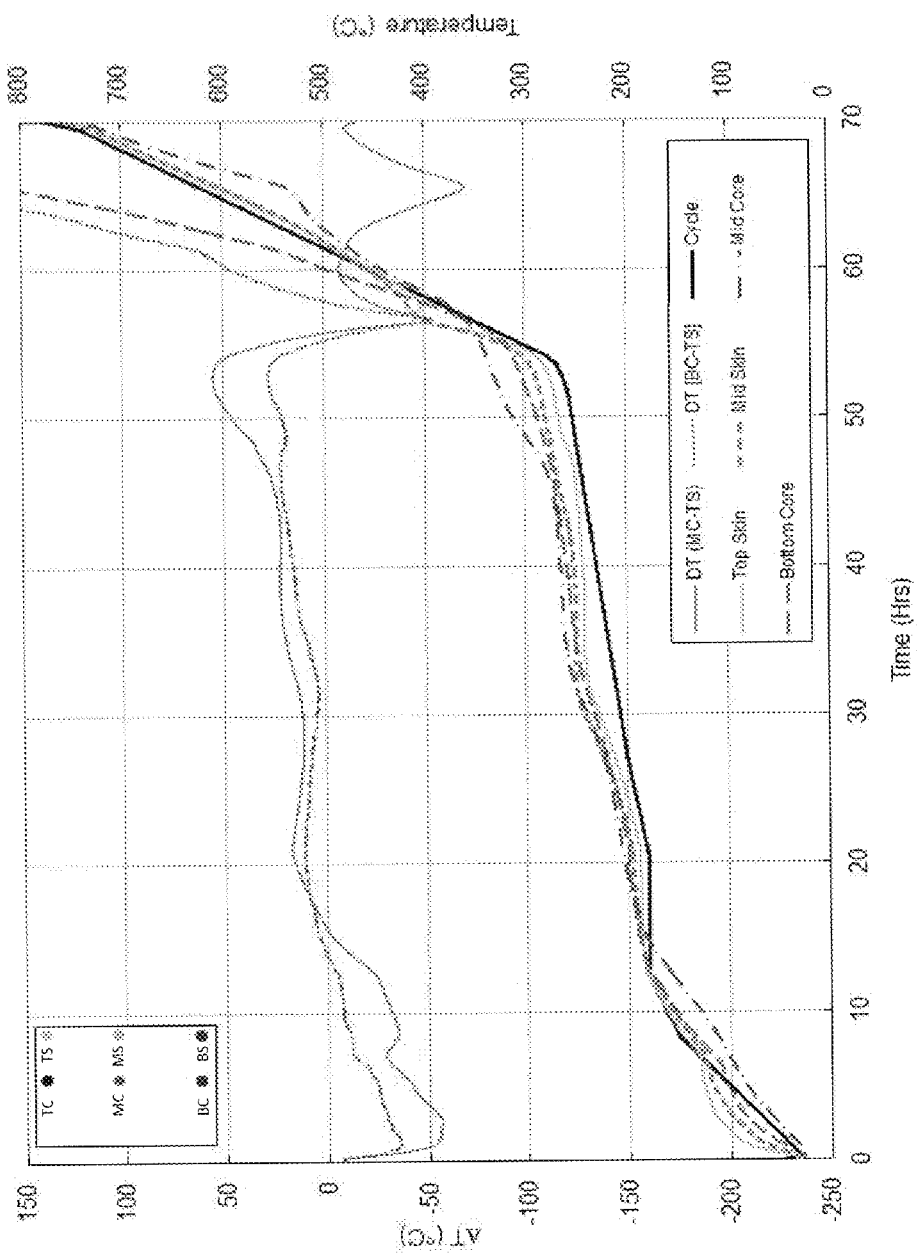
FIG. 12 graphically depicts a time (x-axis) versus temperature (y-axis) plot of various average temperature ramp rates according the firing schedule of example 1 according to one or more embodiments shown and described herein.

Five advanced cordierite green bodies were formed as described above having 13" (about 330 mm) diameter and 17" (about 432 mm) height in a 200/12 configuration, and fired according to the schedule shown in Table 3. The green bodies were heated from room temperature to a pre-heat temperature of 180° C. at a ramp rate of about 12.57° C./hr. The green bodies were then held at the pre-heat temperature for about 8.3 hours. The green bodies had a temperature differential between the mid-core and top skin of about 15.4° C. after the pre-heat hold time. The green bodies were then heated from the pre-heat temperature of 180° C. to a low firing temperature of about 269° C. The average first temperature ramp rate was 2.7° C./hr, while the actual average first temperature ramp rate was increased from about 2.3° C./hr during the initial removal of organics in the skin portion to 7.6° C./hr at 262° C. as shown in FIGS. 3 and 11. Referring to FIG. 12, the average first temperature ramp rate was sufficiently low to control the temperature differential within the part during the initial burning of organics in the skin portion within 50° C. The average first temperature ramp rate was also sufficiently low to control the temperature differential during alumina dehydration to 22.1° C., which is within −20° C. to +40° C. The green bodies were then heated from the low firing temperature of 269° C. to the high firing temperature of 700° C. at a second temperature average ramp rate of 29.6° C./hr as shown in FIGS. 3 and 11, while allowing for a gradual transition of ramp rates between 269° C. to 300° C. The firing cycle was able to sufficiently remove organics before the onset of clay dehydration in the body. None of the fired green bodies had cracking. The total cycle time for this experiment was about 135 hours, while the cycle time to fire the body from room temperature to the high firing temperature (700° C.) was about 68 hours.

Example 2

Figure 13:
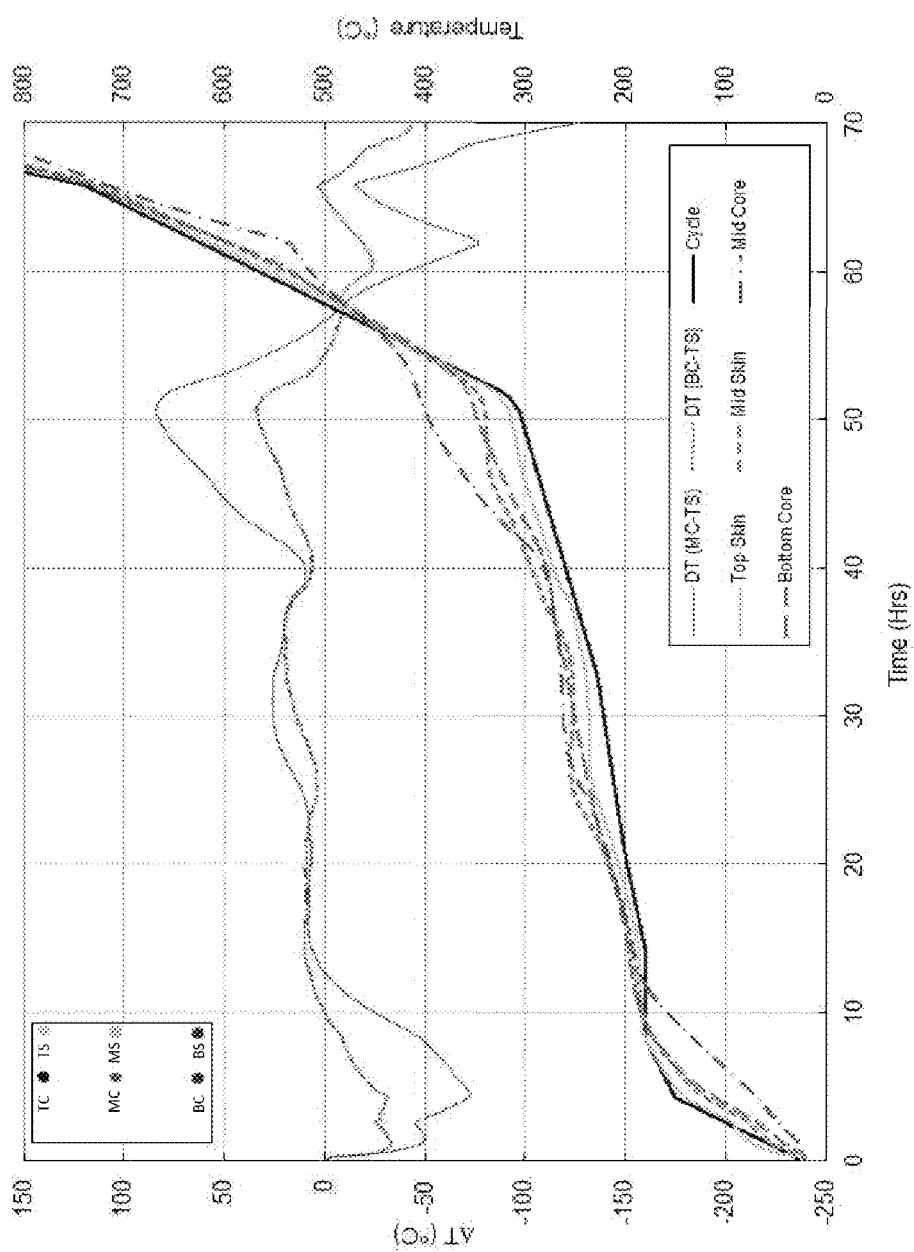
FIG. 13 graphically depicts a time (x-axis) versus temperature (y-axis) plot of various average temperature ramp rates for example 2 according to one or more embodiments shown and described herein.
Figure 14:
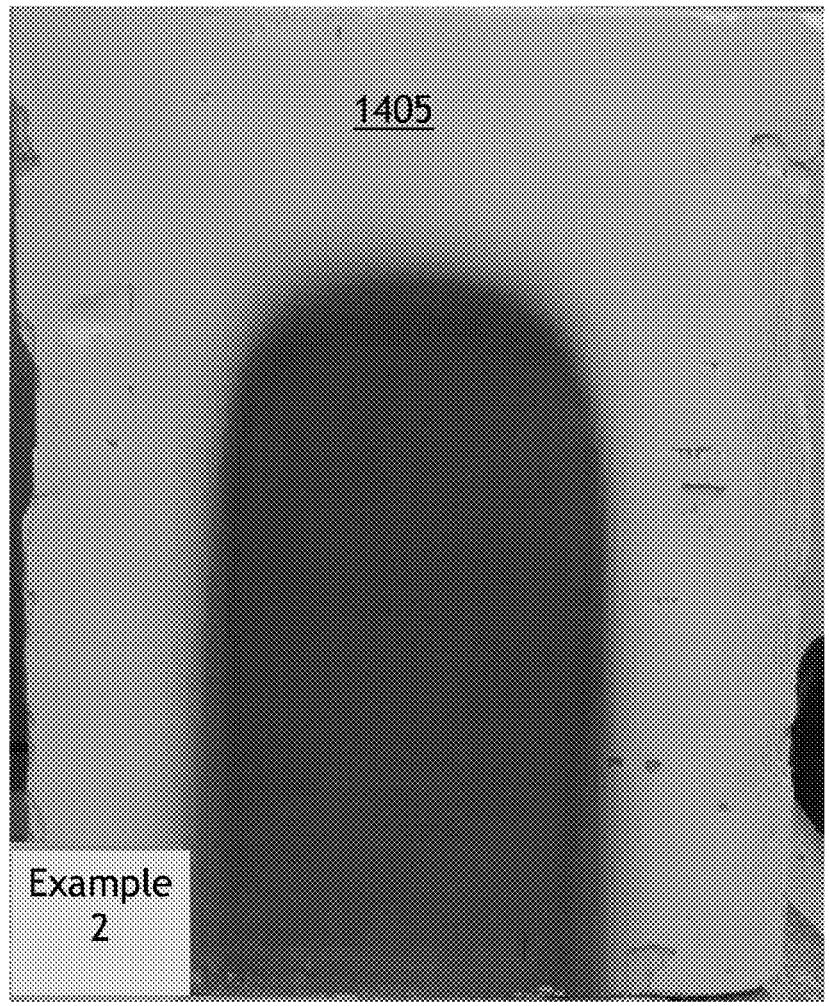
FIG. 14 photographically depicts a char profile of a cordierite body fired according to the firing schedule of example 2 according to one or more embodiments shown and described herein.

Five advanced cordierite green bodies were formed as described above having a 13" (about 330 mm) diameter and 17" (about 432 mm) height in a 200/12 configuration, and fired according to the schedule shown in Table 2. The green bodies were heated from room temperature to a pre-heat temperature of 180° C. at a ramp rate of about 18.98° C./hr. The green bodies were then held at the pre-heat temperature for about 6 hours. The green bodies had a temperature differential between the mid-core and top skin of about 7.6° C. after the pre-heat hold time. The green bodies were then heated from the pre-heat temperature of 180° C. to a low firing temperature of about 315° C. The average first temperature ramp rate was 3.8° C./hr, while the actual average first temperature ramp rate was increased from about 2.3° C./hr during the initial removal of organics in the skin portion to 4.4° C./hr during alumina dehydration as shown in FIGS. 3 and 11. Referring to FIG. 13, the average first temperature ramp rate was sufficiently low to control the temperature differential within the part during the initial burning of organics in the skin portion within 50° C. The average first temperature ramp rate was also sufficiently low to control the temperature differential during alumina dehydration to 9.4° C., which is within −20° C. to +40° C. The green bodies were then heated from the low firing temperature of 315° C. to the high firing temperature of 700° C. at a second temperature average ramp rate of 29.0° C./hr as shown in FIGS. 3 and 11, while allowing for a gradual transition of ramp rates between 315° C. to 350° C. The firing cycle was able to sufficiently remove organics before the onset of clay dehydration in the body. Referring to FIG. 14, a char profile of the removal of organics from the skin portion (1405) before the onset of clay dehydration is depicted. None of the fired green bodies had cracking. The total cycle time for this experiment was about 105 hours, while the cycle time to fire the body from room temperature to the high firing temperature (700° C.) was about 62 hours.

Example 3

Figure 15:
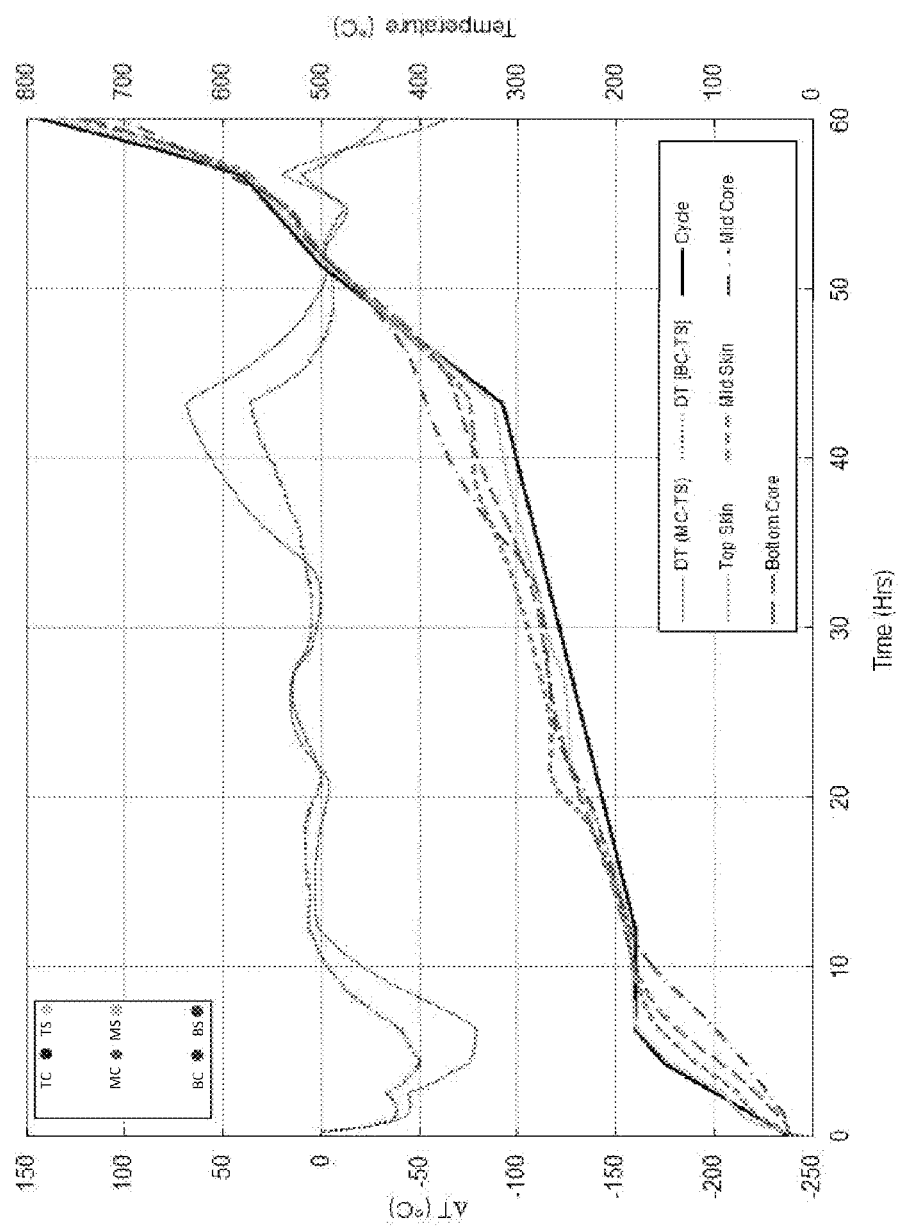
FIG. 15 graphically depicts a time (x-axis) versus temperature (y-axis) plot of various average temperature ramp rates for example 3 according to one or more embodiments shown and described herein.

Five advanced cordierite green bodies were formed as described above having 13" (about 330 mm) diameter and 17" (about 432 mm) height in a 200/12 configuration, and fired according to the schedule shown in Table 3. The green bodies were heated from room temperature to a pre-heat temperature of 180° C. at a ramp rate of about 25.14° C./hr. The green bodies were then held at the pre-heat temperature for about 6 hours. Referring to FIG. 15, the green bodies had a temperature differential between the mid-core and top skin of about 0° C. after the pre-heat hold time. In order to accommodate this faster first temperature average ramp rate of 4.4° C. (as compared to Example 1), the low firing temperature was increased to 315° C. (as compared to 269° C. for Example 1). The first temperature average ramp rate during was sufficiently low to control the temperature differential within the part during the initial burning of organics in the skin portion within 50° C. The average first temperature ramp rate was also sufficiently low to control the temperature differential during alumina dehydration to 2.4° C., which is within −20° C. to +40° C. The green bodies were then heated from the low firing temperature of 315° C. to the high firing temperature of 700° C. at a second temperature average ramp rate of 24.8° C./hr as shown in FIGS. 3 and 11. The firing cycle was able to sufficiently remove organics before the onset of clay dehydration in the body. None of the fired green bodies had cracking. The total cycle time for this experiment was about 103 hours, while the cycle time to fire the body from room temperature to the high firing temperature (700° C.) was about 59 hours.

Example 4

Figure 16:
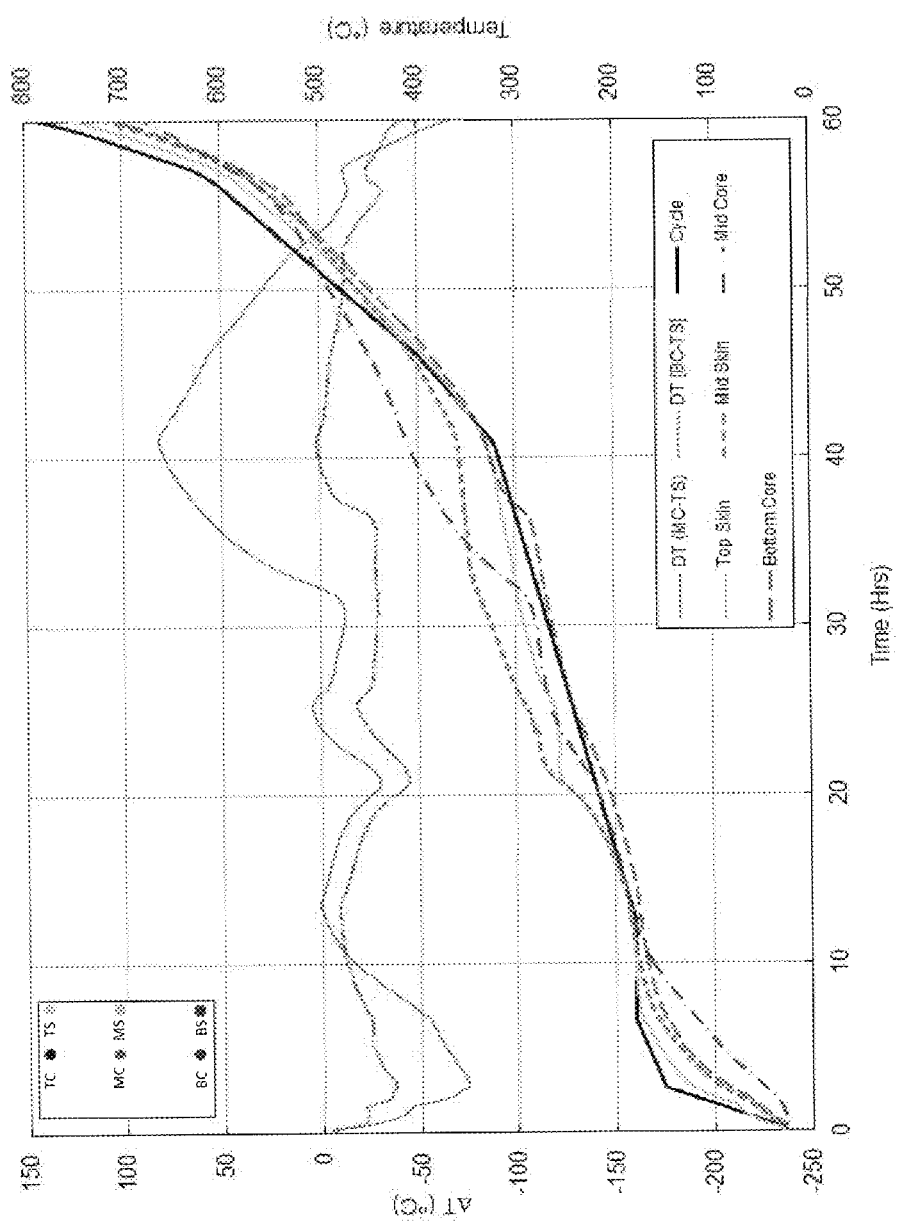
FIG. 16 graphically depicts a time (x-axis) versus temperature (y-axis) plot of various average temperature ramp rates for example 4 according to one or more embodiments shown and described herein.

Five advanced cordierite green bodies were formed as described above having 13" (about 330 mm) diameter and 17" (about 432 mm) height in a 200/12 configuration, and fired according to the schedule shown in Table 3. The green bodies were heated from room temperature to a pre-heat temperature of 180° C. at a ramp rate of about 23.8° C./hr. The green bodies were then held at the pre-heat temperature for about 6 hours. Referring to FIG. 16, the green bodies had a temperature differential between the mid-core and top skin of about −29° C. after the pre-heat hold time. The green bodies were then heated from the pre-heat temperature of 180° C. to a low firing temperature of about 320° C. at a ramp rate of 5° C./hr. In order to accommodate this faster first temperature average ramp rate (as compared to Example 1), the green bodies were then heated at a slower second temperature average ramp rate of 21.2° C./hr from the low firing temperature to the high firing temperature of 700° C. Referring to FIGS. 3 and 11, the second temperature average ramp rate was gradually increased from 5° C./hr to 10° C./hr by 400° C. to allow more time for organic removal, especially from the skin portion before clay dehydration. The second temperature average ramp rate through clay dehydration was kept at 10° C./hr. The firing cycle was able to sufficiently remove organics before the onset of clay dehydration in the body, while keeping the temperature differential during alumina dehydration sufficiently low. None of the fired green bodies had cracking. The total cycle time for this experiment was about 103 hours, while the cycle time to fire the body from room temperature to the high firing temperature (700° C.) was about 59 hours.

Example 5

Figure 17:
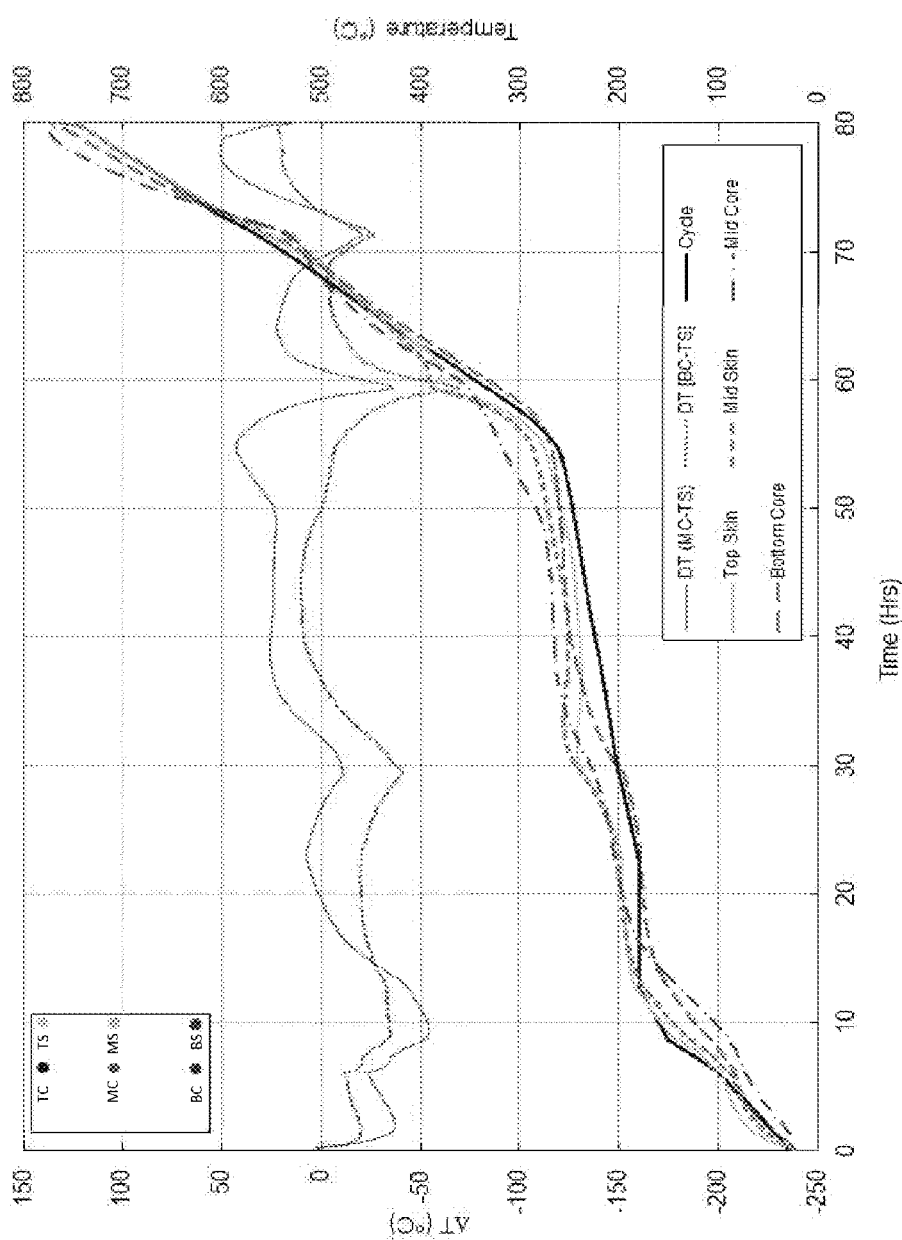
FIG. 17 graphically depicts a time (x-axis) versus temperature (y-axis) plot of various average temperature ramp rates for example 5 according to one or more embodiments shown and described herein.

23 advanced cordierite green bodies were formed as described above having 13" (about 330 mm) diameter and 17" (about 432 mm) height in a 200/12 configuration, and fired according to the schedule shown in Table 3. The green bodies were heated from room temperature to a pre-heat temperature of 180° C. at a ramp rate of about 12.16° C./hr. The green bodies were then held at the pre-heat temperature for about 10 hours. Referring to FIG. 17, the green bodies had a temperature differential between the mid-core and top skin of about 7° C. after the pre-heat hold time. The green bodies were then heated from the pre-heat temperature of 180° C. to a low firing temperature of about 269° C. The first temperature average ramp rate was 2.7° C./hr and the actual ramp rate was increased from about 2.3° C./hr to 10° C./hr during the alumina dehydration as shown in FIG. 17. The first temperature average ramp rate was sufficiently low to control the temperature differential within the part during the initial burning of organics in the skin portion within 50° C. The average first temperature ramp rate was also sufficiently low to control the temperature differential during alumina dehydration to 24.2° C., which is within −20° C. to +40° C. The green bodies were then heated from the low firing temperature of 269° C. to the high firing temperature of 700° C. at a second temperature average ramp rate of 19.4° C./hr as shown in FIGS. 11 and 17, allowing for gradual increases of the second temperature average ramp rate from 10° C./hr at 269° C. to 20° C./hr at 400° C. The firing cycle was able to sufficiently remove organics before the onset of clay dehydration in the body, while keeping the temperature differential during alumina dehydration sufficiently low. Very low levels (4%) of the fired green bodies had cracking. The total cycle time for this experiment was about 136 hours, while the cycle time to fire the body from room temperature to the high firing temperature (700° C.) was about 78 hours. As compared to Example 1, the slower average ramp rates throughout the cycle were not detrimental to product cracking; however, the firing cycle times were not reduced.

Example 6

Figure 18:
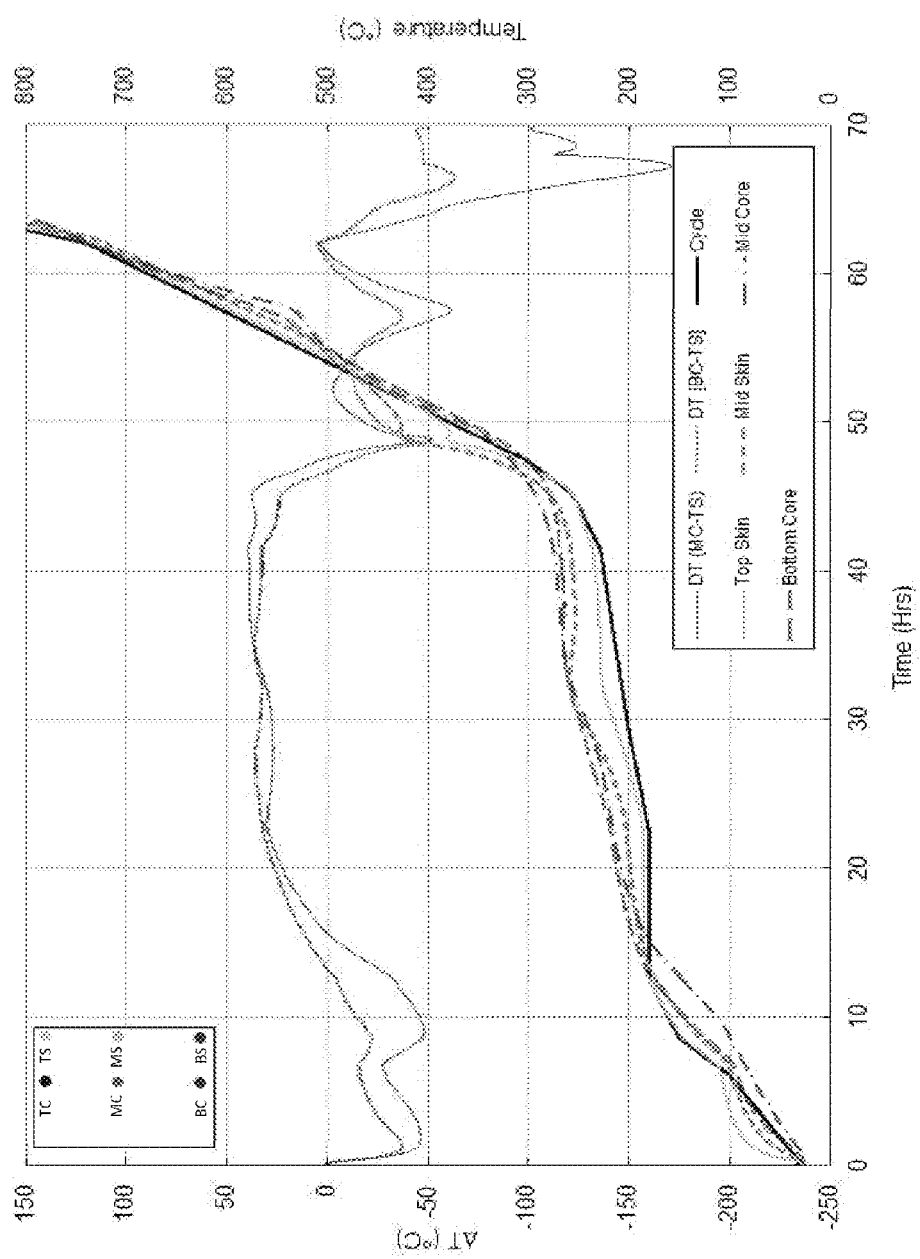
FIG. 18 graphically depicts a time (x-axis) versus temperature (y-axis) plot of various average temperature ramp rates for example 6 according to one or more embodiments shown and described herein.

Five advanced cordierite green bodies were formed as described above having 13" (about 330 mm) diameter and 17" (about 432 mm) height in a 200/12 configuration, and fired according to the schedule shown in Table 3. The green bodies were fired using a time temperature schedule similar to Comparative Example A; however, the oxygen levels in the kilns were increased in the kiln to 15.4% during heating from the pre-heat temperature to the low firing temperature. The green bodies were heated from room temperature to a pre-heat temperature of 180° C. at a ramp rate of about 12.16° C./hr. The green bodies were then held at the pre-heat temperature for about 10 hours. Referring to FIG. 18, the green bodies had a temperature differential between the mid-core and top skin of about 27° C. after the pre-heat hold time. The green bodies were then heated from the pre-heat temperature of 180° C. to a low firing temperature of about 255° C. The first temperature average ramp rate was gradually increased from about 2.3° C./hr during initial burning of organics from the skin portion to about 7.5° C./hr during alumina dehydration. Average ramp rate during this regime was about 3.3° C./hr. As in Comparative Example A, the alumina dehydration reaction is not complete upon reaching the low firing temperature (255° C.). Furthermore, the organic content is typically not sufficiently reduced due to a reduction in the low temperature. However, this was offset by the higher oxygen levels. Higher $O_2$ levels allowed for further reduction of organic content prior to clay dehydration. Thus, a possible tradeoff exists between the first temperature average ramp rate and the oxygen levels, such that a higher first temperature average ramp rate (or shorter time between the pre-heat temperature and low firing temperature) can be accommodated at higher oxygen levels, which allow for substantial organic removal from the skin portion. In this example, none of the fired green bodies had cracking. The total cycle time for this experiment was about 103 hours, while the cycle time to fire the body from room temperature to the high firing temperature (700° C.) was about 61 hours.

Example 7

Figure 19:
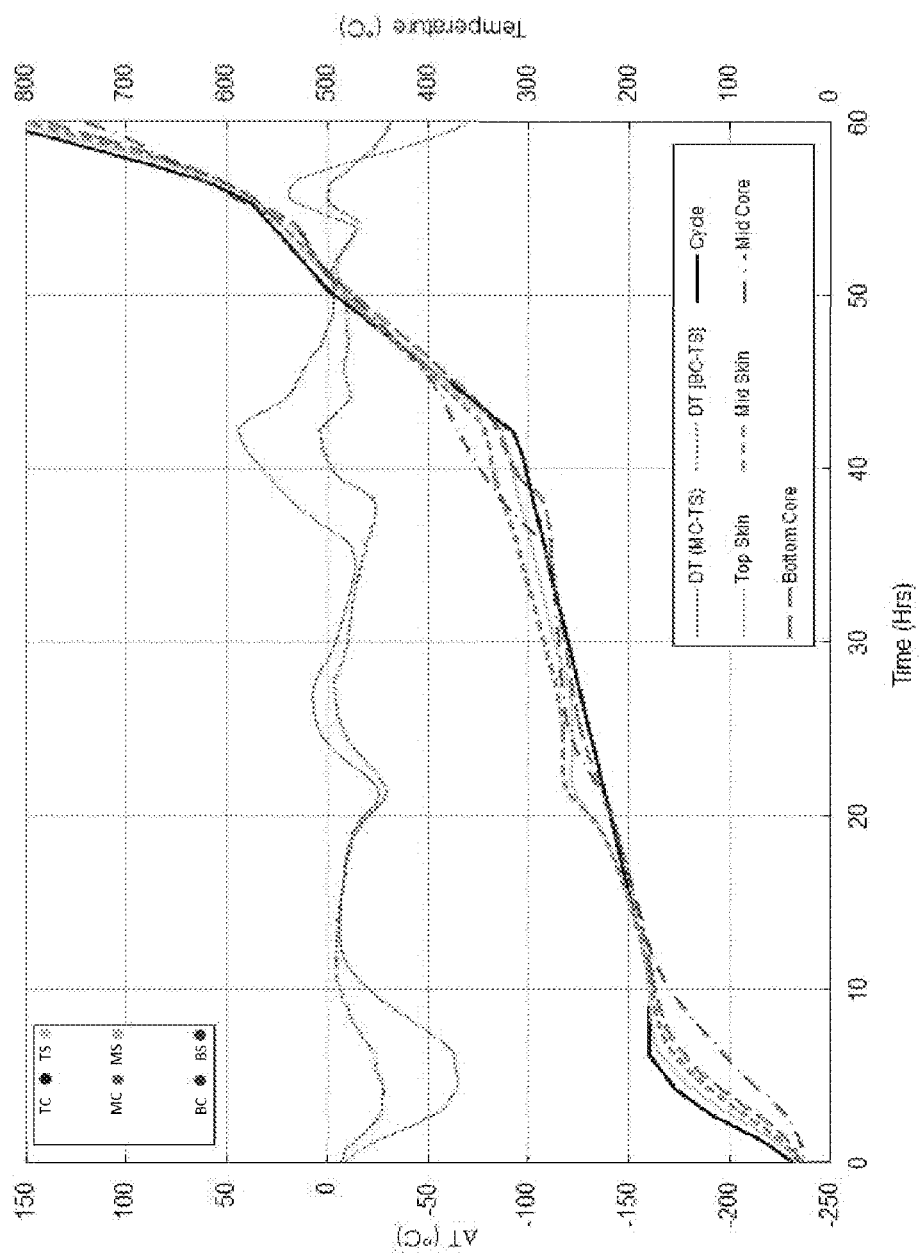
FIG. 19 graphically depicts a time (x-axis) versus temperature (y-axis) plot of various average temperature ramp rates for example 7 according to one or more embodiments shown and described herein.

116 advanced cordierite green bodies having various size and cell geometry conditions were formed as described above. The various part sizes ranged from 12" (about 305 mm) diameter and 11" (about 280 mm) height, 12" (about 305 mm) diameter and 13.5" (about 343 mm) height, and 13" (about 330 mm) diameter and 17" (about 432 mm) height. Referring to FIG. 19, the green bodies were fired using a time temperature schedule similar to Example 3 as shown in Table 3. The green bodies were heated from room temperature to a pre-heat temperature of 180° C. at a pre-heat temperature ramp rate of about 25.14° C./hr. The green bodies were then held at the pre-heat temperature for about 6 hours. The green bodies had a temperature differential between the mid-core and top skin of about −24° C. after the pre-heat hold time. In order to accommodate this faster first temperature average ramp rate of 4.5° C. (as compared to Example 1), the low firing temperature was increased to 320° C. The green bodies were then heated from the low firing temperature of 320° C. to the high firing temperature of 700° C. at a second temperature average ramp rate of 24.9° C./hr as shown in FIGS. 3 and 11. Very low crack levels of <6% were obtained for a large sample size of green bodies.

Example 8

Figure 20:
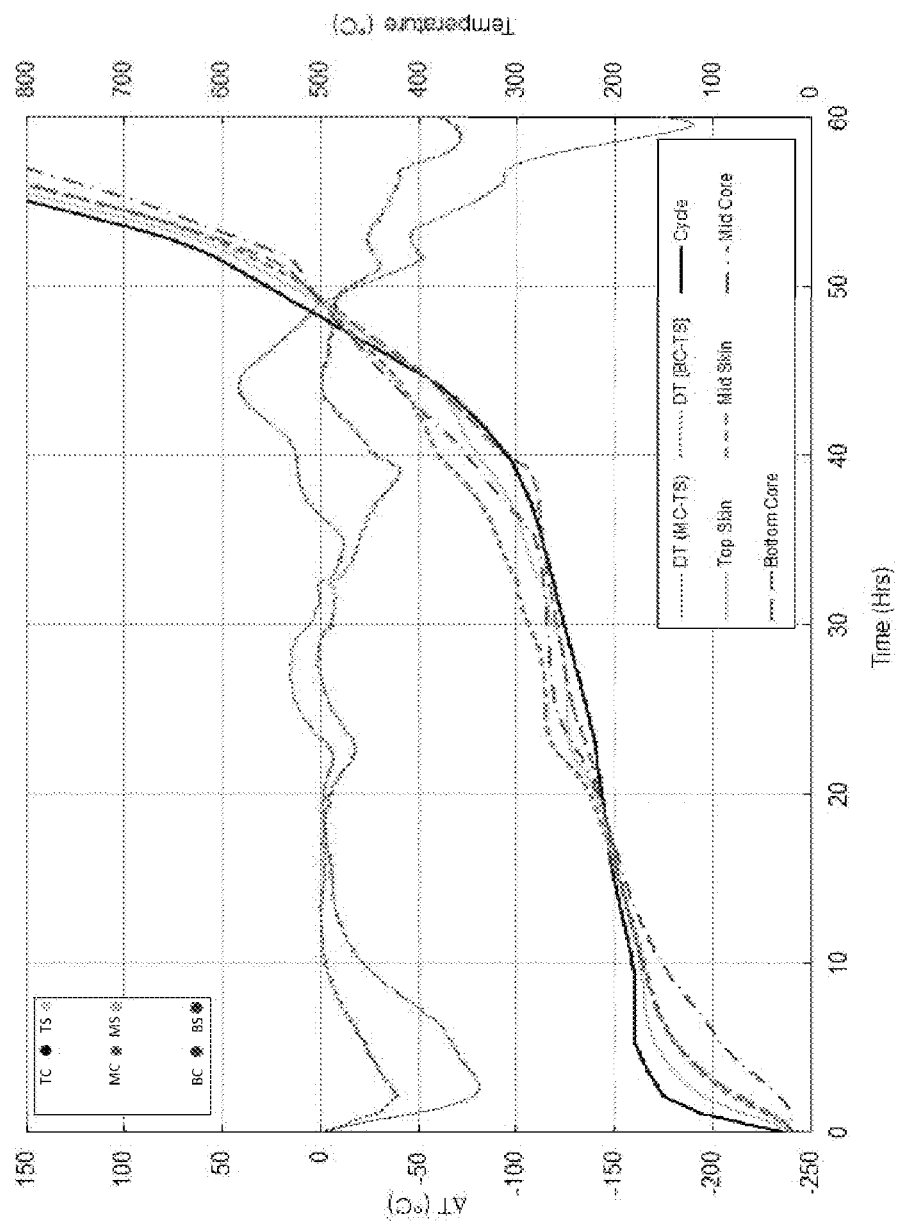
FIG. 20 graphically depicts a time (x-axis) versus temperature (y-axis) plot of various average temperature ramp rates for example 8 according to one or more embodiments shown and described herein.
Figure 21:
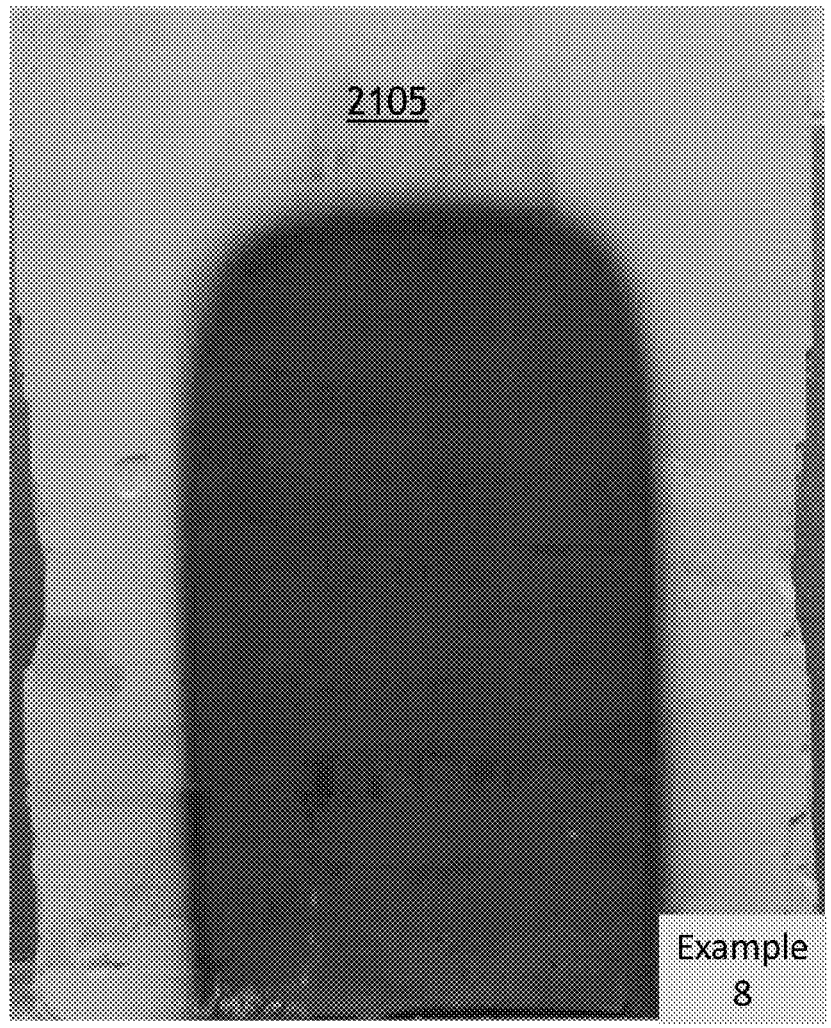
FIG. 21 photographically depicts a char profile of a cordierite body fired according to the firing schedule of example 8 according to one or more embodiments shown and described herein.

18 advanced cordierite green bodies were formed as described above having 13" (about 330 mm) diameter and 17" (about 432 mm) height in a 200/12 configuration, and fired according to the schedule shown in Table 3. Referring to FIG. 20, the green bodies were heated from room temperature to a pre-heat temperature of 180° C. at a ramp rate of about 30.5° C./hr. The green bodies were then held at the pre-heat temperature for about 4.5 hours. The green bodies had a temperature differential between the mid-core and top skin of about −8° C. after the pre-heat hold time. The green bodies were then heated from the pre-heat temperature of 180° C. to a low firing temperature of about 290° C. The average ramp rate during the first temperature average ramp rate was 3.8° C./hr. Actual first temperature average ramp rate was about 2.3° C./hr during the initial burning of organics in the skin portion and was increased to about 6° C./hr during the alumina dehydration as shown in FIGS. 3, 11 and 20. The first temperature average ramp rate was sufficiently low to control the temperature differential within the part during the initial burning of organics in the skin portion within 50° C. The average first temperature ramp rate was also sufficiently low to control the temperature differential during alumina dehydration to −1.7° C., which is within −20° C. to +40° C. The green bodies were then heated from the low firing temperature of 290° C. to the high firing temperature of 700° C. at a second temperature average ramp rate of 26.7° C./hr, allowing for a gradual increase of the second temperature average ramp rate from 6° C./hr to 31° C./hr from 290° C. to 400° C. The firing cycle was able to sufficiently remove organics before the onset of clay dehydration in the body, while keeping the temperature differential during alumina dehydration sufficiently low. Referring to FIG. 21, a char profile of the removal of organics from the skin portion (2105) before the onset of clay dehydration is depicted. None of the fired green bodies had cracking. The total cycle time for this experiment was about 102 hours, while the cycle time to fire the body from room temperature to the high firing temperature (700° C.) was about 54 hours.

Example 9

Figure 22:
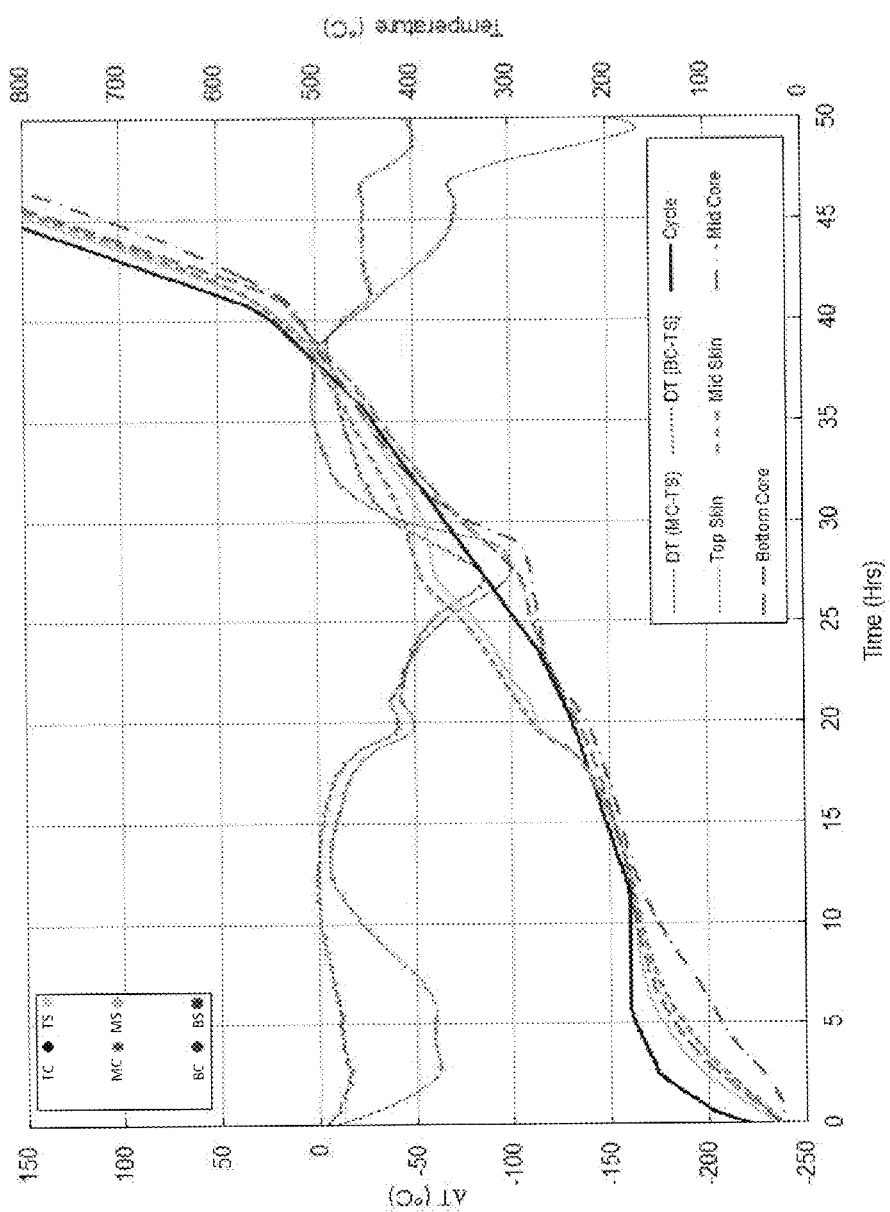
FIG. 22 graphically depicts a time (x-axis) versus temperature (y-axis) plot of various average temperature ramp rates for example 9 according to one or more embodiments shown and described herein.
Figure 23:
FIG. 23 photographically depicts a char profile of a cordierite body fired according to firing schedule of example 9 according to one or more embodiments shown and described herein.

31 advanced cordierite green bodies were formed as described above having 13" (about 330 mm) diameter and 17" (about 432 mm) height in a 200/12 configuration, and fired according to the schedule shown in Table 3. Referring to FIG. 22, the green bodies were heated from room temperature to a pre-heat temperature of 180° C. at a ramp rate of about 26.6° C./hr. The green bodies were then held at the pre-heat temperature for about 6 hours. The green bodies had a temperature differential between the mid-core and top skin of about −6° C. after the pre-heat hold time. The green bodies were then heated from the pre-heat temperature of 180° C. to a low firing temperature of about 272° C. The first temperature average ramp rate was 7.8° C./hr. Actual first temperature average ramp rate was about 7° C./hr during the initial burning of organics in the skin portion and was increased to about 10° C./hr during the alumina dehydration as shown in FIGS. 11 & 22. The green bodies were then heated from the low firing temperature of 272° C. to the high firing temperature of 700° C. at a second temperature average ramp rate of 22.1° C./hr as shown in FIGS. 11 and 22. A high first temperature average ramp rate was later accommodated by a low second temperature average ramp rate of about 15° C./hr during the burning of organics in the core portion. The firing cycle was able to sufficiently remove organics before the onset of clay dehydration in the body. Referring to FIG. 23, a char profile of the removal of organics from the skin portion (2305) before the onset of clay dehydration is depicted. Low levels (13%) of cracking were observed. The total cycle time for this experiment was about 91 hours, while the cycle time to fire the body from room temperature to the high firing temperature (700° C.) was about 43 hours.

Example 10

Figure 24:
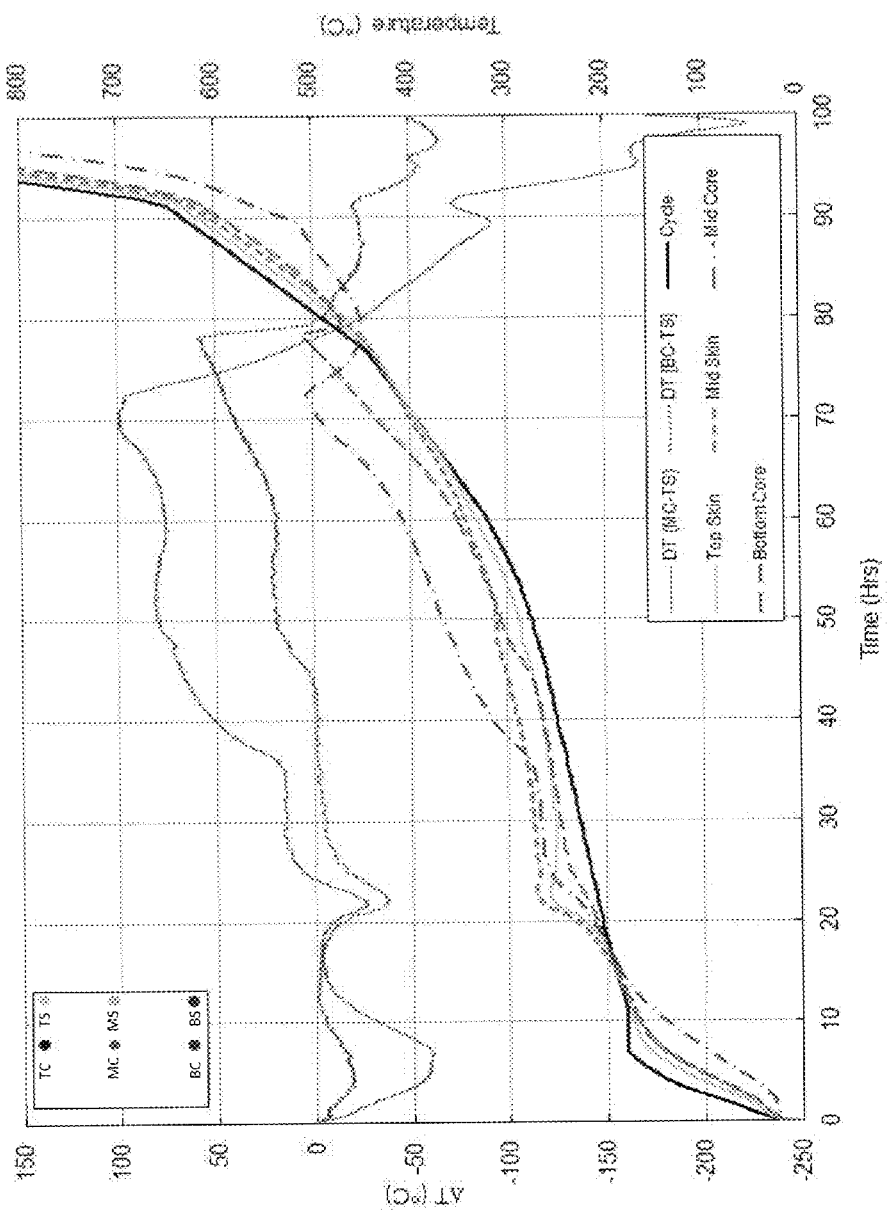
FIG. 24 graphically depicts a time (x-axis) versus temperature (y-axis) plot of various average temperature ramp rates for example 10 according to one or more embodiments shown and described herein.

33 advanced cordierite green bodies were formed as described above having 13" (about 330 mm) diameter and 17" (about 432 mm) height in a 200/12 configuration, and fired according to the schedule shown in Table 3. Referring to FIG. 24, the green bodies were heated from room temperature to a pre-heat temperature of 180° C. at a ramp rate of about 23.2° C./hr. The green bodies were then held at the pre-heat temperature for about 5 hours. The green bodies had a temperature differential between the mid-core and top skin of about −19° C. after the pre-heat hold time. The green bodies were then heated from the pre-heat temperature of 180° C. to a low firing temperature of about 315° C. The first temperature average ramp rate was 2.8° C./hr. Actual first temperature average ramp rate was about 2.3° C./hr during the initial burning of organics in the skin portion and was increased to about 3° C./hr during alumina dehydration as shown in FIGS. 11 and 24. The average first temperature ramp rate was also sufficiently low to control the temperature differential during alumina dehydration to −1.7° C., which is within −20° C. to +40° C. The green bodies were then heated from the low firing temperature of 315° C. to the high firing temperature of 700° C. at a second temperature average ramp rate of 11.6° C./hr as shown in FIGS. 11 and 24, allowing for gradual increases of the second temperature average ramp rate from 7° C./hr at 315° C. to 14° C./hr at about 450° C. The firing cycle was able to sufficiently remove organics before the onset of clay dehydration in the body. Very low levels (3%) of cracking were observed. The total cycle time for this experiment was about 150 hours, while the cycle time to fire the body from room temperature to the high firing temperature (700° C.) was about 92 hours.

TABLE 3

| Cycle ID | RT to Pre-heat Ramp Rate | Pre-heat Time | Low Temperature | Pre-heat to Low Temp RR | Pre-heat to Low Temp O2 | High Temperature | Low to High Temp (700 C.) RR | Low to High Temp O2 | Crack Result | Pre-heat DT @ PH Temp | Alumina DT @ Low Temp |
|---|---|---|---|---|---|---|---|---|---|---|---|
| Example 1 | 12.57 | 8.3 | 269 | 2.69 | 12.60% | 700 | 29.57 | 13.60% | 0% (5) | 15.4 | 22.1 |
| Example 2 | 18.98 | 6 | 315 | 3.79 | 13.30% | 700 | 29.06 | 13.30% | 0% (5) | 7.6 | 9.4 |
| Example 3 | 25.14 | 6 | 315 | 4.36 | 12.44% | 700 | 24.84 | 13.26% | 0% (5) | 0 | 2.4 |
| Example 4 | 23.85 | 6 | 320 | 5.00 | 15.57% | 700 | 21.16 | 14.85% | 0% (5) | −29 | −12 |
| Example 5 | 12.16 | 10 | 269 | 2.71 | 14.00% | 700 | 19.44 | 14.15% | 4% (23) | 7 | 24.2 |
| Example 6 | 12.16 | 10 | 255 | 3.34 | 15.36% | 700 | 28.40 | 15.90% | 0% (5) | 27 | 36 |
| Example 7 | 25.14 | 6 | 320 | 4.49 | 11.90% | 700 | 24.86 | 15.00% | 5.2% (116) | −24 | −13.5 |
| Example 8 | 30.49 | 4.5 | 290 | 3.81 | 11.90% | 700 | 26.71 | 16.35% | 0% (18) | −8.0 | −1.7 |
| Example 9 | 26.57 | 6 | 272 | 7.82 | 12.10% | 700 | 22.07 | 14.30% | 13% (31) | −6.0 | −99 |
| Example 10 | 23.25 | 5 | 315 | 2.85 | 13.10% | 700 | 11.63 | 16.50% | 3% (33) | −19.0 | 16.1 |

It should now be understood that the methods described herein may be used to reduce the firing cycle time for manufacturing cordierite ceramic bodies. The methods described herein also reduce the occurrence of cracks in the ceramic bodies and, as a result, reduce production losses and increase production efficiencies.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:
1. A method of firing a cordierite body, the method comprising:
   providing a green body having a core portion and a skin portion, the green body comprising cordierite-forming raw materials and organic material, wherein the cordierite-forming raw materials comprise hydrous alumina and clay;
   pre-heating the green body to a pre-heat temperature that is less than a thermal decomposition temperature of the organic material;

maintaining the green body at the pre-heat temperature for a period of time sufficient to obtain a temperature differential between the core portion and the skin portion of less than about 50° C.;

heating the green body at a first temperature average ramp rate from the pre-heat temperature to a low firing temperature in a firing atmosphere comprising a first oxygen concentration for a period of time sufficient to reduce a content of the organic material and to substantially remove chemically bound water from the hydrous alumina; and heating the green body from the low firing temperature to a high firing temperature, wherein at least a portion of the heating from the low firing temperature to the high firing temperature is at a second temperature average ramp rate in a firing atmosphere comprising a second oxygen concentration that is greater than the first oxygen concentration for a period of time sufficient to reduce the content of the organic material, and the content of the organic material is substantially removed prior to a removal of chemically bound water from clay.

2. The method of claim 1, wherein heating the green body from the low firing temperature to the high firing temperature comprises:

heating the green body at the second temperature average ramp rate from the low firing temperature to an intermediate temperature that is less than the high firing temperature; and heating the green body at a third temperature average ramp rate from the intermediate temperature to the high firing temperature such that chemically bound water from the clay is substantially removed.

3. The method of claim 2, wherein the third temperature average ramp rate is from about 10° C./hr to about 40° C./hr.

4. The method of claim 2, wherein a sum of the period of time sufficient to reduce the organic material content and a period of time sufficient to substantially remove chemically bound water from the clay is from about 12 hours to about 30 hours.

5. The method of claim 1, wherein the pre-heat temperature is in a range from about 150° C. to about 200° C.

6. The method of claim 1, wherein the pre-heat temperature is reached in a time period of less than about 7 hours.

7. The method of claim 1, wherein the green body is maintained at the pre-heat temperature for a period of time ranging from about 2 hours to about 8 hours.

8. The method of claim 1, wherein the first temperature average ramp rate is less than about 12° C./hour.

9. The method of claim 1, wherein the first oxygen concentration is from about 11% to about 14%.

10. The method of claim 1, wherein the low firing temperature is in a range from about 250° C. to about 300° C.

11. The method of claim 1, wherein the green body is heated to the low firing temperature such that a temperature differential between the core portion and the skin portion is less than about 70° C.

12. The method of claim 1, wherein a sum of the period of time sufficient to reduce the organic material content and a period of time sufficient to substantially remove chemically bound water from the hydrous alumina is less than about 40 hours.

13. The method of claim 1, wherein the second temperature average ramp rate is in a range of about 5° C./hour to about 40° C./hour.

14. The method of claim 1, wherein the second oxygen concentration is from about 14% to about 18%.

15. The method of claim 1, wherein the high firing temperature is in a range from about 500° C. to about 700° C.

16. The method of claim 1, wherein the cordierite-forming raw materials comprise a magnesia source, a hydrous alumina source, a silica source, and kaolin clay.

17. The method of claim 1, wherein the method further comprises heating the green body to a soak temperature for a period of time sufficient to form a cordierite fired body.

18. The method of claim 1, wherein the method has a total firing time from about 90 hours to about 150 hours in length.

19. The method of claim 1, wherein the green body has a diameter ranging from about 8 in. to about 14 in. and a height ranging from about 9 in, to about 19 in.

20. A method of firing a cordierite-forming body comprising:

providing a green body having a core portion surrounded by a skin portion, the green body comprising cordierite-forming raw materials and greater than or equal to about 10 wt % organic material, wherein the cordierite-forming raw materials comprise hydrous alumina and clay;

pre-heating the green body to a pre-heat temperature at a pre-heat average ramp rate from about 6° C./hr to about 50° C./hr, wherein the pre-heat temperature is no more than 70° C. below a thermal decomposition temperature of the organic material;

maintaining the green body at the pre-heat temperature for a time period from about 2 hours to about 8 hours such that a temperature differential between the core portion and the skin portion is less than about 70° C.;

heating the green body at a first temperature average ramp rate from the pre-heat temperature to a low firing temperature in a firing atmosphere comprising from about 9 wt % to about 15 wt % oxygen, wherein the low firing temperature is from about 270° C. to about 320° C., and the first temperature average ramp rate is equal to or less than about 7° C./hr; and heating the green body from the low firing temperature to a high firing temperature in a firing atmosphere comprising from about 12 wt % to about 18 wt % oxygen, wherein the high firing temperature is from about 500° C. to about 700° C., at least a portion of the heating of the green body from the low firing temperature to the high firing temperature is at a second temperature average ramp rate that is from about 7° C./hr to about 40° C./hr to reduce a content of the organic material, and the content of the organic material is substantially removed prior to a removal of chemically bound water from the clay.

21. The method of claim 20, wherein heating the green body from the low firing temperature to the high firing temperature comprises:

heating the green body at the second temperature average ramp rate from the low firing temperature to an intermediate temperature that is less than the high firing temperature; and heating the green body at a third temperature ramp rate average from the intermediate temperature to the high firing temperature such that chemically bound water from the clay is substantially removed.

22. The method of claim 21, wherein the third temperature average ramp rate is from about 10° C./hr to about 40° C./hr.

23. The method of claim 20, wherein the thermal decomposition temperature of the organic material is in a range from about 200° C. to about 250° C.

24. The method of claim 20, wherein the pre-heat temperature is reached in a time period of less than about 7 hours.

25. The method of claim 20, wherein the green body is heated to the low firing temperature such that a temperature differential between the core portion and the skin portion is less than about 70° C.

26. The method of claim 20, wherein a period of time sufficient to heat the green body to the low firing temperature is less than about 40 hours.

27. The method of claim 20, wherein a period of time sufficient to heat the green body to the high firing temperature is less than about 15 hours.

28. The method of claim 20, wherein the method further comprises heating the green body to a soak temperature for a period of time sufficient to form a cordierite fired body.

29. The method of claim 20, wherein the method has a total firing time from about 90 hours to about 150 hours in length.

30. The method of claim 20, wherein the green body has a diameter ranging from about 8 in. to about 14 in. and a height ranging from about 9 in, to about 19 in.

31. The method of claim 20, wherein the cordierite-forming raw materials comprise a magnesia source, a hydrous alumina source, a silica source, and kaolin clay.

32. A method of firing a cordierite-forming body comprising:
provided a green body having a core portion surrounded by a skin portion, the green body comprising cordierite-forming raw materials and greater than or equal to about 10 wt % organic material, wherein the cordierite-forming raw materials comprise hydrous alumina and clay;
pre-heating the green body to a pre-heat temperature for a first time period of less than about 7 hours, wherein the pre-heat temperature is no more than 70° C. below a thermal decomposition temperature of the organic material;
maintaining the green body at the pre-heat temperature for a second time period from about 2 hours to about 8 hours such that a temperature differential between the core portion and the skin portion is less than about 70° C.;
heating the green body for a third time period from the pre-heat temperature to a low firing temperature in a firing atmosphere comprising from about 9% to about 15% oxygen, wherein the low firing temperature is from about 270° C. to about 320° C., and the third time period is less than about 40 hours; and
heating the green body for a fourth time period from the low firing temperature to a high firing temperature in a firing atmosphere comprising from about 12% to about 18% oxygen, the firing atmosphere sufficient to substantially reduce a content of the organic material prior to removal of chemically bound water from the clay, wherein the high firing temperature is from about 500° C. to about 700° C. and the fourth time period is less than about 15 hours.

33. The method of claim 32, wherein the thermal decomposition temperature of the organic material is in a range from about 200° C. to about 250° C.

34. The method of claim 32, wherein the temperature differential between the core portion and the skin portion is less than about 50° C.

35. The method of claim 32, wherein the content of the organic material is reduced at a first temperature average ramp rate and the chemically bound water from clay is substantially removed at a second temperature average ramp rate.

* * * * *